(12) United States Patent
Scanlon

(10) Patent No.: US 10,939,746 B2
(45) Date of Patent: Mar. 9, 2021

(54) ROTATABLE HOOK ASSEMBLY

(71) Applicant: Erica Scanlon, Aurora, CO (US)

(72) Inventor: Erica Scanlon, Aurora, CO (US)

(*) Notice: Subject to any disclaimer, the term of this patent is extended or adjusted under 35 U.S.C. 154(b) by 118 days.

(21) Appl. No.: 15/974,959

(22) Filed: May 9, 2018

(65) Prior Publication Data
US 2018/0325250 A1 Nov. 15, 2018

Related U.S. Application Data

(60) Provisional application No. 62/503,891, filed on May 9, 2017.

(51) Int. Cl.
| | | |
|---|---|---|
| *A45F 5/10* | (2006.01) | |
| *B60N 3/10* | (2006.01) | |
| *A47F 10/00* | (2006.01) | |
| *B60R 7/04* | (2006.01) | |

(52) U.S. Cl.
CPC ............ *A45F 5/1026* (2013.01); *A47F 10/00* (2013.01); *B60N 3/102* (2013.01); *B60N 3/103* (2013.01); *B60R 7/043* (2013.01); *A45F 2005/1033* (2013.01); *A45F 2200/0583* (2013.01)

(58) Field of Classification Search
CPC .............. A45F 2005/1033; A45F 5/102; A45F 5/1026; A47G 29/083; B60N 3/103; B60R 2011/0059; B60R 2011/0017; B62B 3/146; B62B 3/1472
USPC .......................................................... 248/914
See application file for complete search history.

(56) References Cited

U.S. PATENT DOCUMENTS

| | | | | |
|---|---|---|---|---|
| 2,516,760 | A  * | 7/1950 | Doran ................... | A47G 29/083 211/85.3 |
| 5,263,755 | A  * | 11/1993 | Thompson ............ | A45F 5/1026 294/137 |
| 8,066,148 | B2 * | 11/2011 | Garahan .................... | A45F 5/02 220/737 |
| 8,123,269 | B2 * | 2/2012 | Zhang ................... | A45F 5/1026 294/137 |
| 8,246,095 | B2 * | 8/2012 | Radle .................... | A45F 5/1026 24/16 R |
| 8,308,125 | B2 * | 11/2012 | Losaw .................... | F16B 45/02 248/339 |
| 8,668,177 | B2 * | 3/2014 | Stein .................... | A47G 29/083 248/308 |
| 8,851,234 | B2 * | 10/2014 | Bachorski ............... | A45F 5/102 16/422 |
| 9,345,353 | B2 * | 5/2016 | Forbes .................... | G09F 21/04 |
| 9,453,527 | B2 * | 9/2016 | Yoo .......................... | F16B 45/00 |
| 9,586,529 | B1 * | 3/2017 | Sanchez ................... | B60R 7/10 |
| 9,631,771 | B1 * | 4/2017 | Abels ...................... | F16B 45/02 |
| 9,677,597 | B2 * | 6/2017 | Yoo .......................... | F16B 45/02 |
| 10,040,469 | B2 * | 8/2018 | Bacallao ............... | B62B 3/1472 |
| 10,137,917 | B2 * | 11/2018 | Hennessy ................ | B62B 3/04 |
| 10,137,919 | B2 * | 11/2018 | Winton .................... | B62B 3/00 |
| 10,239,548 | B2 * | 3/2019 | Fiorello ............... | B62B 3/1472 |
| 2005/0056746 | A1 * | 3/2005 | Landver ............... | A47G 29/083 248/227.1 |
| 2015/0251679 | A1 * | 9/2015 | Grimes ................ | B62B 3/1404 280/33.992 |

(Continued)

*Primary Examiner* — Bradley Duckworth
(74) *Attorney, Agent, or Firm* — Paul C. Oestreich; Eminent IP, P.C.

(57) ABSTRACT

A rotatable hook assembly is disclosed, which has a twist handle rotationally coupled to a bag hook for holding bag handles. The assembly may have a lockable attachment such as a cup holder.

20 Claims, 64 Drawing Sheets

(56) References Cited

U.S. PATENT DOCUMENTS

| | | | |
|---|---|---|---|
| 2016/0107668 A1* | 4/2016 | Robins | B62B 3/1472 224/411 |
| 2018/0208224 A1* | 7/2018 | Hennessy | B62B 3/146 |
| 2019/0168793 A1* | 6/2019 | Fiorello | B62B 3/10 |
| 2019/0248398 A1* | 8/2019 | Bacallao | B62B 3/002 |

* cited by examiner

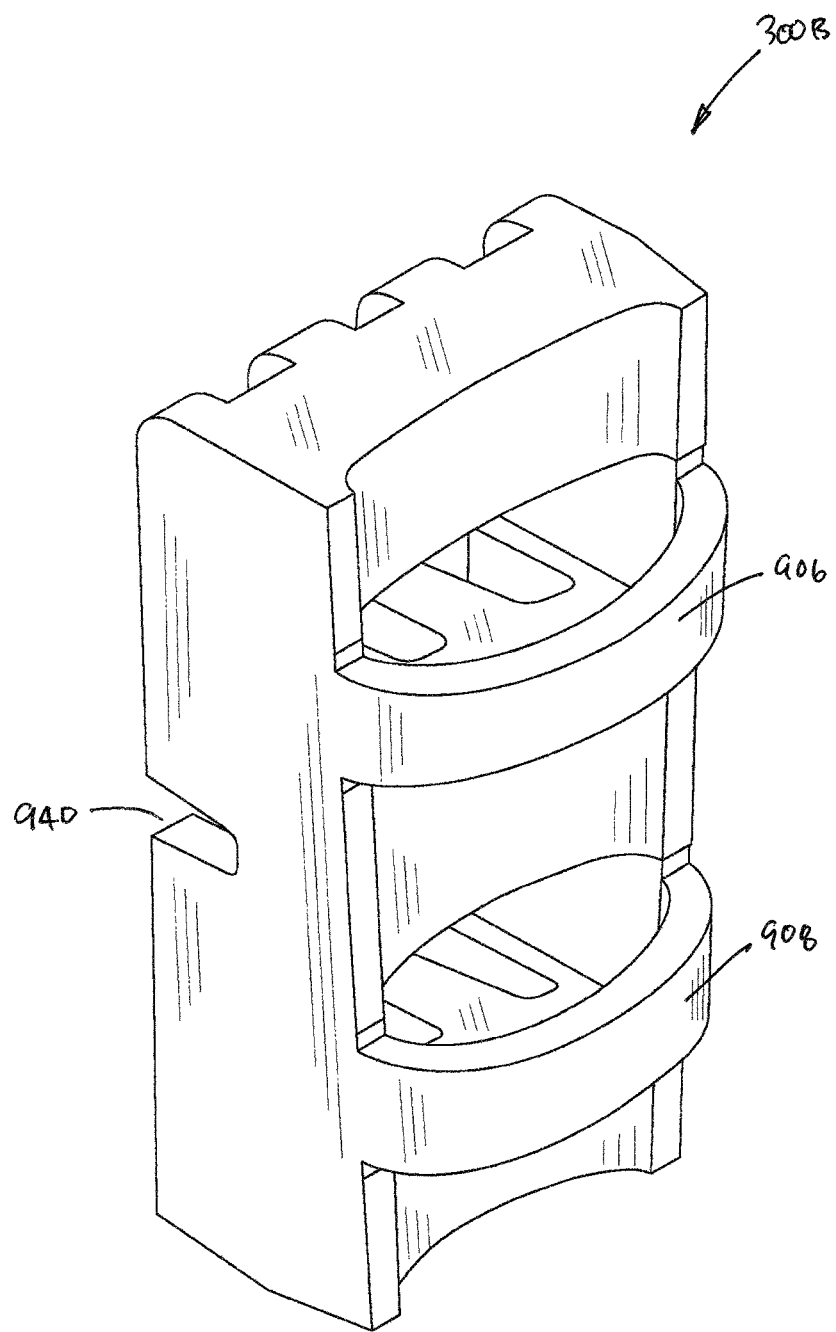

ROTATABLE HOOK ASSEMBLY

BACKGROUND OF THE INVENTION

Field of the Invention: The present invention relates generally to the field of convenience carry articles such as bags, sacks, etc., more specifically, to that of devices for organizing and handling convenience carry articles; and more specifically still, to a rotatable hook assembly for organizing and handling convenience carry bags.

This nonprovisional claims the benefit of and incorporates by reference Provisional Application No. 62/503,891, which was filed on May 9, 2017.

Background of the Invention: Not so many years ago, when a person went shopping at a grocery store or other store, articles that were purchased were placed in boxes, paper sacks, and/or wrapped in bundles for transport home. In more recent times, purchases are placed either in plastic "store bags" or re-usable bags for transport. In either case, handling such bags can be cumbersome and keeping them closed and organized often is challenging.

To address this problem, people may utilize a large carabiner to gather the handles to all their bags. This keeps the bags somewhat organized, but usually has limited space that quickly fills when multiple bag handles are gathered together. Further, the carabiner cannot keep bags suspended upright, and can be difficult to attach to shopping carts, headrests, etc.

A need exists for an organizing device that may be useful for storing plastic bags, is easily usable, and can be easily stored so as not to be lost. Additionally, if the organizing device has additional functions, then that would be desirable.

BRIEF DESCRIPTION OF THE DRAWINGS

FIG. 11A shows a perspective view of a suspension buffer.

BRIEF SUMMARY OF THE INVENTION

Figure 1A:
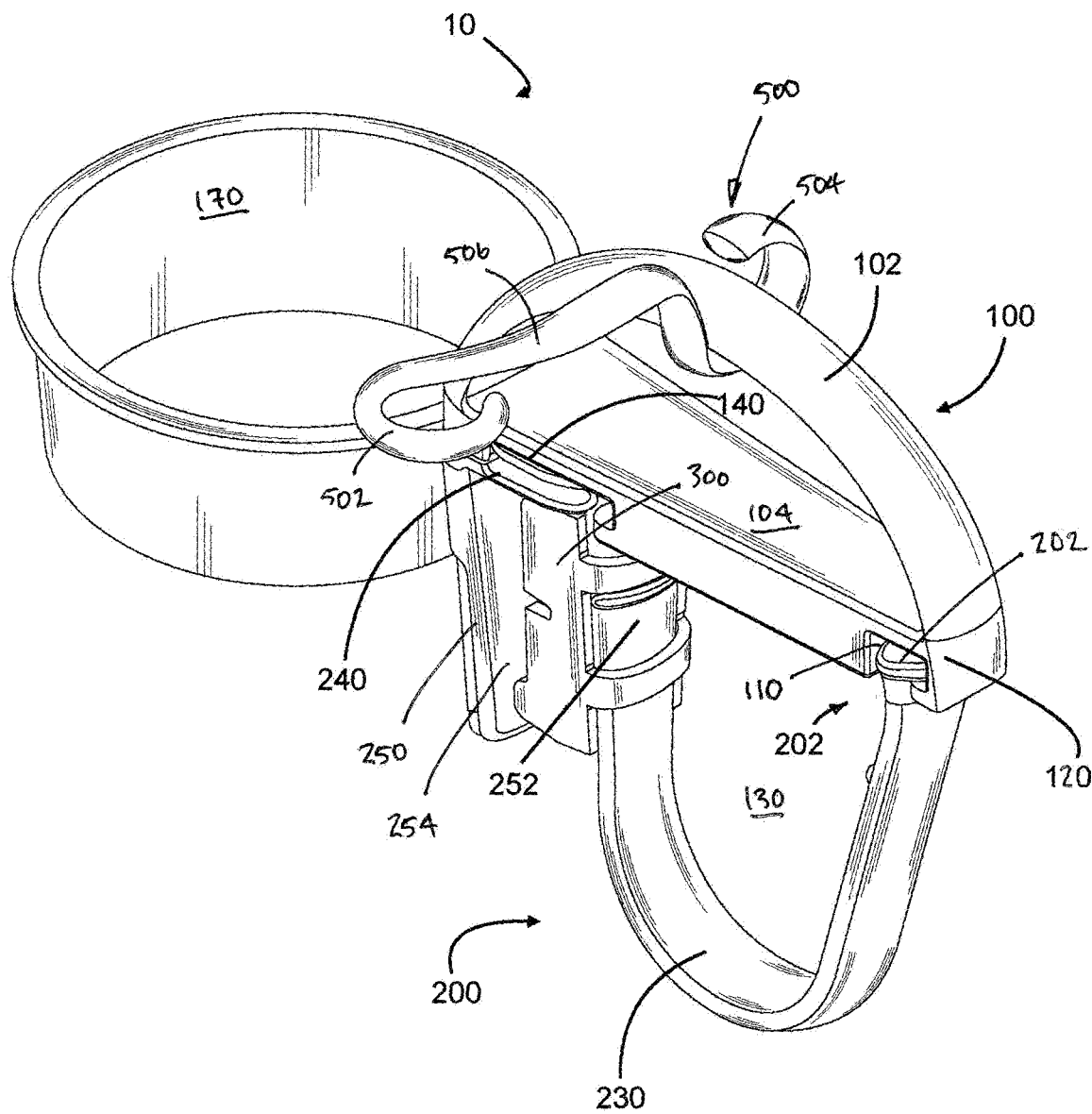
FIG. 1A shows a rear perspective view of a rotatable hook assembly.
Figure 1B:
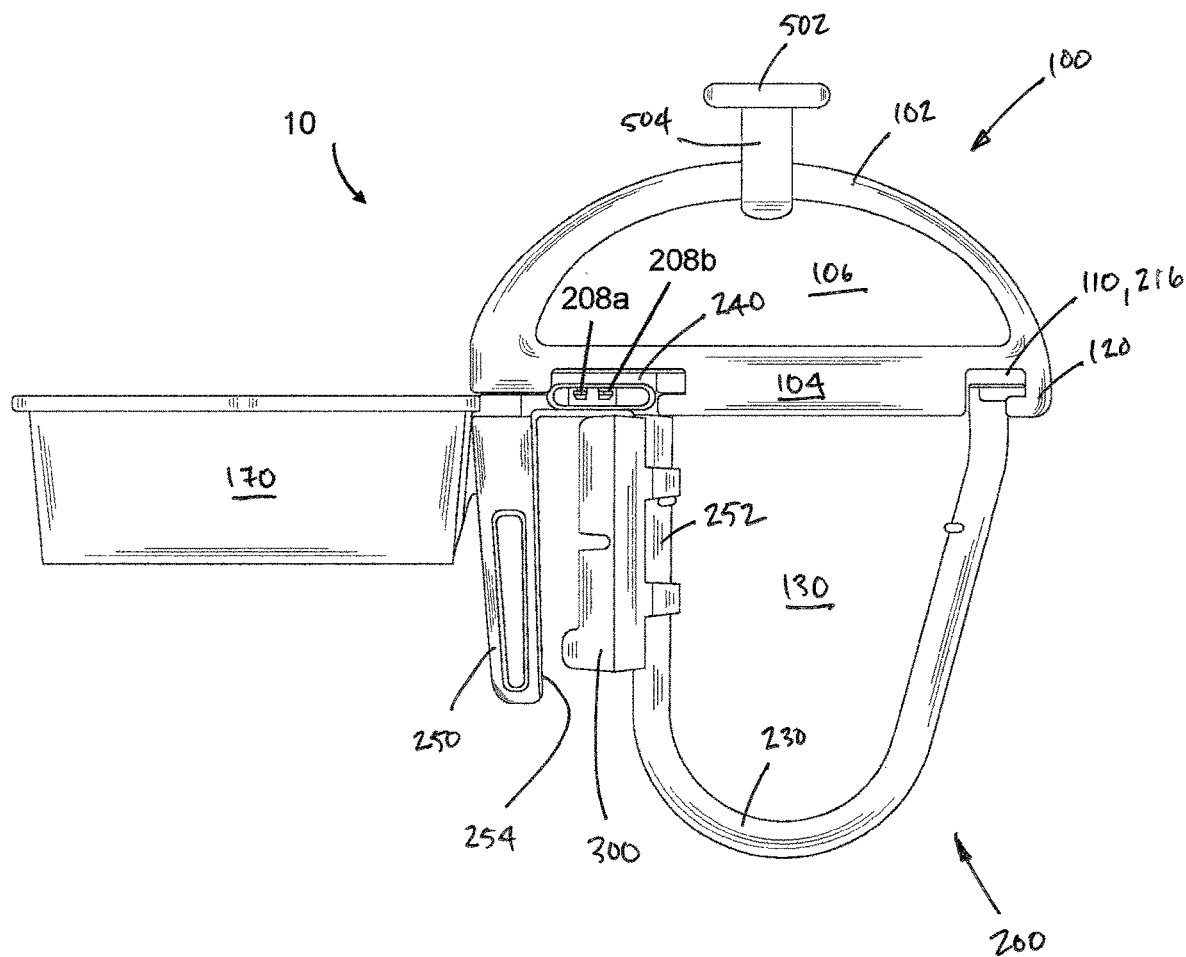
FIG. 1B shows a side view of a rotatable hook assembly.
Figure 1C:
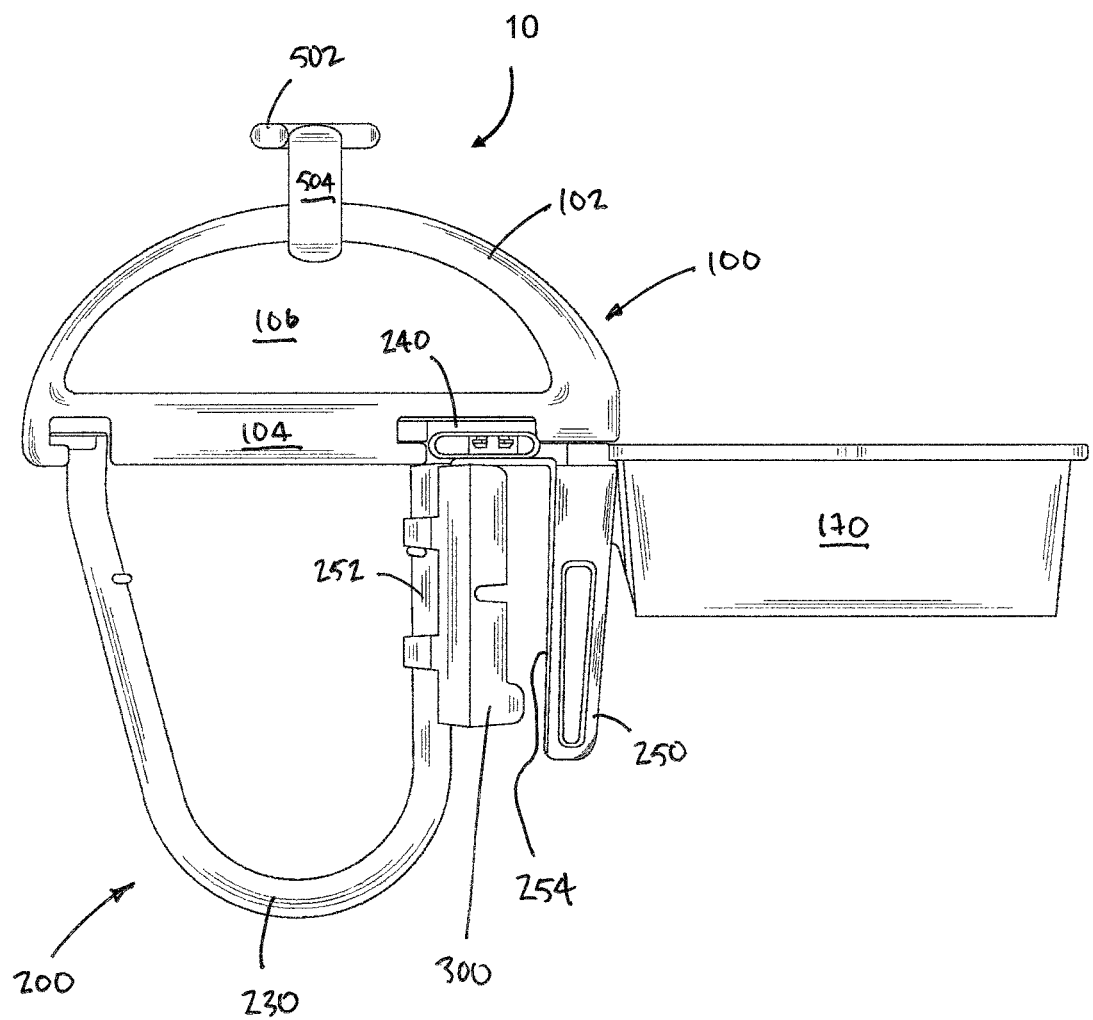
FIG. 1C shows a side view, from the opposite view, of a rotatable hook assembly.
Figure 1D:
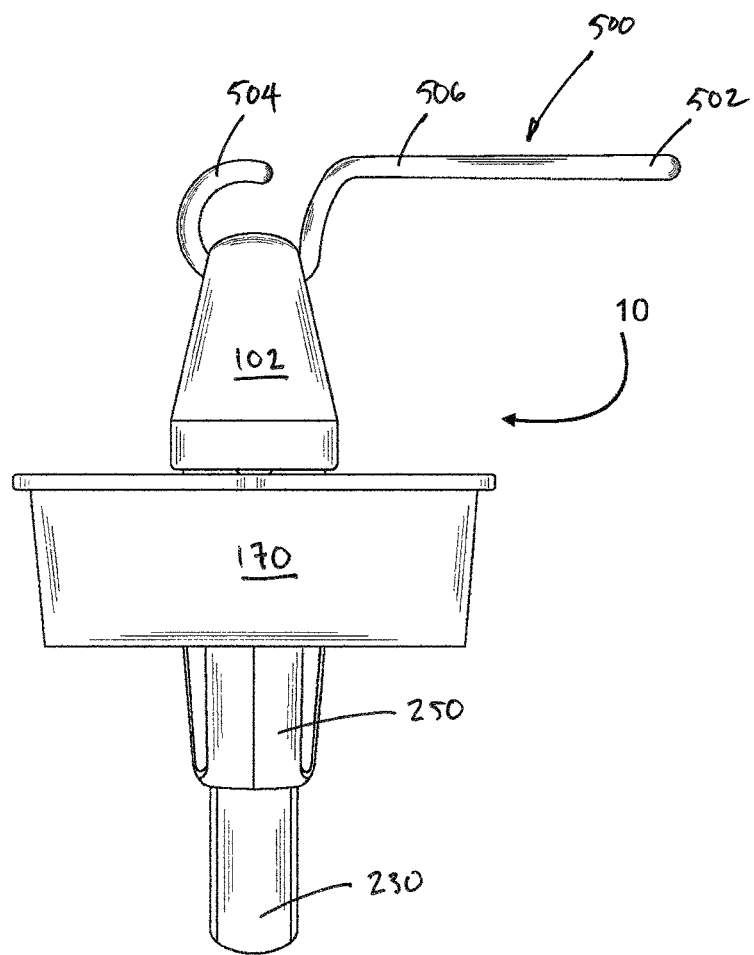
FIG. 1D shows a front view of a rotatable hook assembly.

The rotatable hook assembly 10 is designed to meet all of the above criteria and more. It can comprise five or more primary components: a locking twist handle, a bag hook, a suspension thickness buffer, a lock in accessory, and a headrest storage hook. The locking twist handle functions in concert with the bag hook to form the main body of the rotatable hook assembly 10. Together, they provide for a hook on which a plethora of shopping bag handles (or similar) can be gathered and hooked as well as a locking member which, once activated, secures the handles on the hook. The locking twist handle also comprises a convenient carry handle so that multiple bags can be carried simultaneously by the user in one hand without discomfort, pinching, and other common issues experienced when carrying multiple bags with a bare hand. The twist function allows the locking twist handle to twist open and closed making adding and/or removing bags from the bag hook a simple process. The bag hook can incorporate a first cart member to hang the device from the sidewall of a shopping cart or similar relatively thin, vertical surface. Additionally, a suspension thickness buffer helps the first cart member work for various thicknesses of vertical surfaces by adjusting to fill the void spaces between the first cart member's sides and the vertical surface placed therebetween. An additional lock in accessory can be incorporated into the rotatable hook assembly 10 as well. In one embodiment, this comprises a lock in cup holder that snaps into a groove in the bag hook's exterior and is locked in place by the closing of the twist handle. Optionally attaching to the twist handle can be a headrest storage hook which allows the rotatable hook assembly 10 to be attached to and hang from a vertical tube or support member of an automobile's headrest.

DETAILED DESCRIPTION

It will be readily understood that the components of the present invention, as generally described with reference to the drawings herein, could be implemented in a wide variety of different configurations. Thus, the following more detailed description of the embodiments of the system and method of the present invention, is not intended to limit the scope of the invention, but is merely representative of various embodiments of the invention. Unless explicitly stated, the use of "or" means and/or, that is, this the nonexclusive meaning of the term "or". Exemplary embodiments are described below and in the accompanying Figures. The following detailed description provides a review of the drawing Figures in order to provide a thorough understanding of, and an enabling description for, these embodiments. One having ordinary skill in the art will understand that in some cases well-known structures and functions have not been shown or described in detail to avoid unnecessarily obscuring the description of the embodiments.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples. Similarly, in this disclosure, language such as "could, should, may, might, must, have to, can, would, need to, is, is not", etc. and all such similar language shall be considered interchangeable whenever possible such that the scope of the invention is not unduly limited. For example, a comment such as: "item X is used" can be interpreted to read "item X may be used".

FIGS. 1A to 1H are various views of a first exemplary embodiment of a rotatable hook assembly 10. FIG. 1A introduces a rear perspective view of a first exemplary embodiment of a rotatable hook assembly 10 with a number of sub-components depicted with reference numbers. The rotatable hook assembly 10 embodiment shown in FIG. 1A may have a twist handle 100 which may be configured to be locked. The twist handle 100 may have an entrapment bay 110 to entrap and hold a locking portion 202 (see FIG. 1A)

of the bag hook 200, thereby ensuring that any bag handles (not shown) that have been threaded through the bag hook 200 are trapped thereon and generally cannot be removed from an area, or aperture 130 (see FIGS. 1A and 1B), defined above by the twist handle 100 and below by the bag hook 200 without unlocking the bag hook 200 from the twist handle 100 and purposefully removing a bag or by ripping open the handle of a bag so as to create an opening. The entrapment bay 110 may incorporate a lock flange 120 to define a locking area for locking the bag hook 200 into the entrapment bay 110.

Extending upwards from the entrapment bay 110 may be a grasp handle 102. Grasp handle 102 may be configured with an arcuate member attached to a generally linear base member 104. Grasp handle 102 may provide a grasping surface so that a user can wrap the user's fingers around the grasp handle 102, in the opening 106 formed between grasp handle 102 and base member 104, and carry the rotatable hook assembly 10 as well as all the bags suspended therefrom without the pinching and discomfort commonly experienced when attempting to carry multiple bags with a single hand of the user.

Referring now to FIGS. 12A-12E, the bag hook 200 (FIG. 1A) may be rotationally coupled within a rotation bay 140 (see e.g., FIG. 12B) to a rotatable member 204 extending from within the rotation bay 140. In some preferred embodiments, rotatable member 204 may have a plurality of compressible prongs 208a, 208b, which may be inserted into the rotatable member receiver 206 of the bag hook 200. Each of the plurality of compressible prongs 208a, 208b may have an upper portion 210 and a lower head portion 212 (see, e.g., FIGS. 12B and 12C).

Referring briefly to FIGS. 7A-7G, the bag hook 200 is further described. The rotatable member receiver 206 mentioned above, may have a void member 209 which defines a void which is large enough to accommodate the plurality of compressible prongs 208a, 208b when the compressible prongs 208a, 208b are squeezed together, but the void may be not large enough to allow the lower head portion 212 of each of the compressible prongs 208a, 208b to be removed from the void defined by the void member 209 when the compressible prongs 208a, 208b are not compressed. In some preferred embodiments, rotatable member 204 may be a void that receives a fastener and an optional washer. See FIG. 7 of the provisional application from which this application claims a benefit.

In some preferred embodiments, an accessory lock 150 (see FIG. 1H), which may have one or more protrusions, may extend downwards from grasp handle 102. Preferably located at the end of grasp handle 102, the accessory lock 150 may be twisted clockwise or counterclockwise about the rotatable member 204 so as to lock an accessory, such as a cup holder 170, via accessory mount 430 (see, e.g., FIGS. 8A-8C) into the accessory mount receiver 214 (see, e.g., FIGS. 7A, 7D and 7F) of bag hook 200.

Figure 5A:
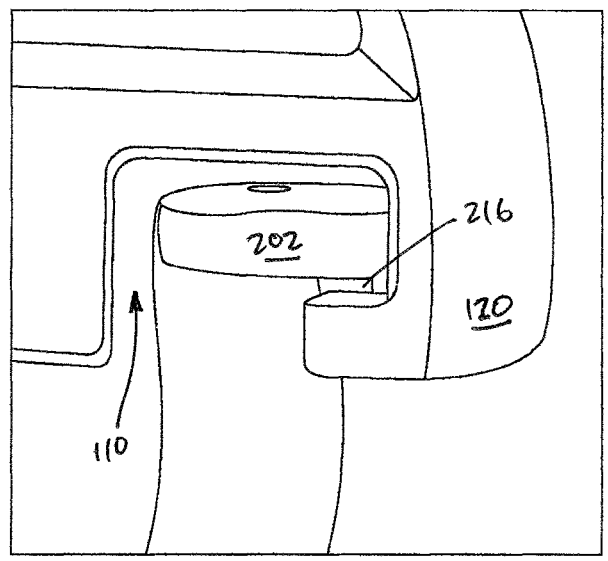
FIG. 5A shows an entrapment tooth engaged with the bag hook.
Figure 5B:
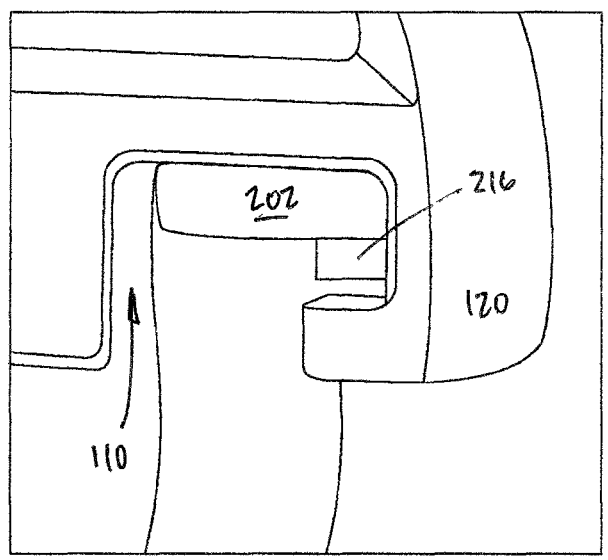
FIG. 5B shows the entrapment tooth when in an elevated position.
Figure 6A:
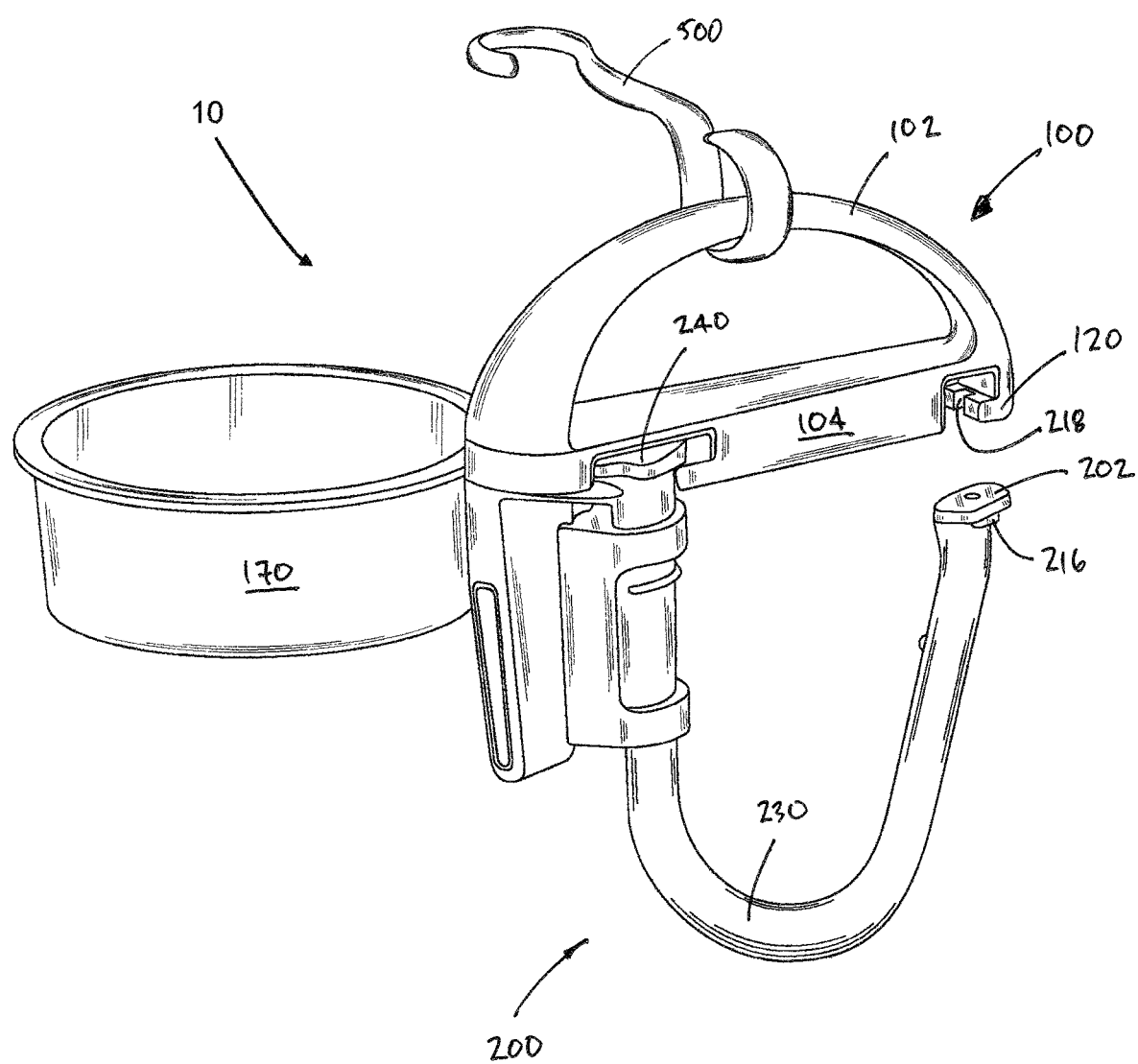
FIG. 6A shows the rotatable hook assembly in an open position where bags can be inserted or removed.
Figure 6B:
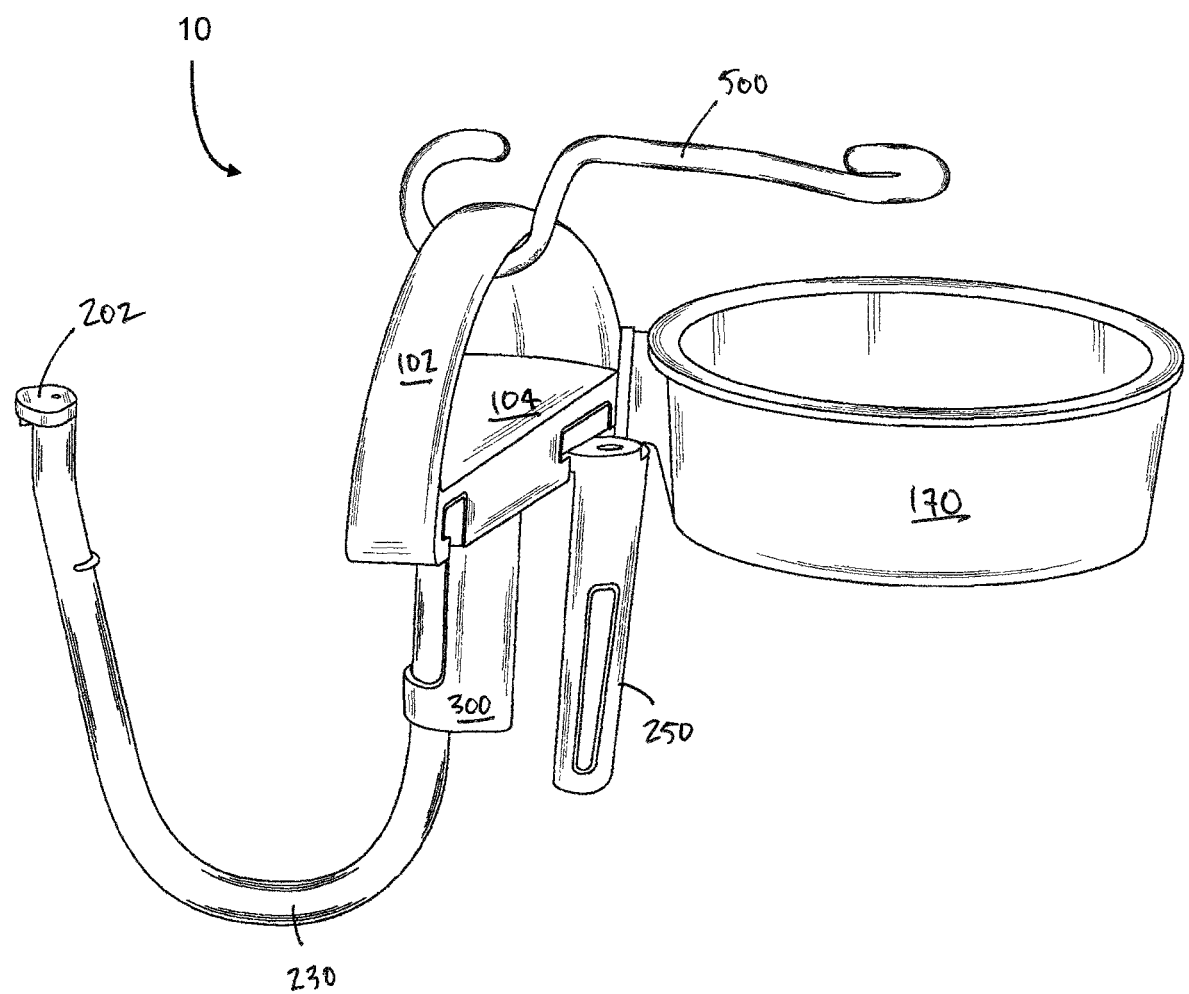
FIG. 6B shows an another view of the rotatable hook assembly of FIG. 6A.
Figure 7A:
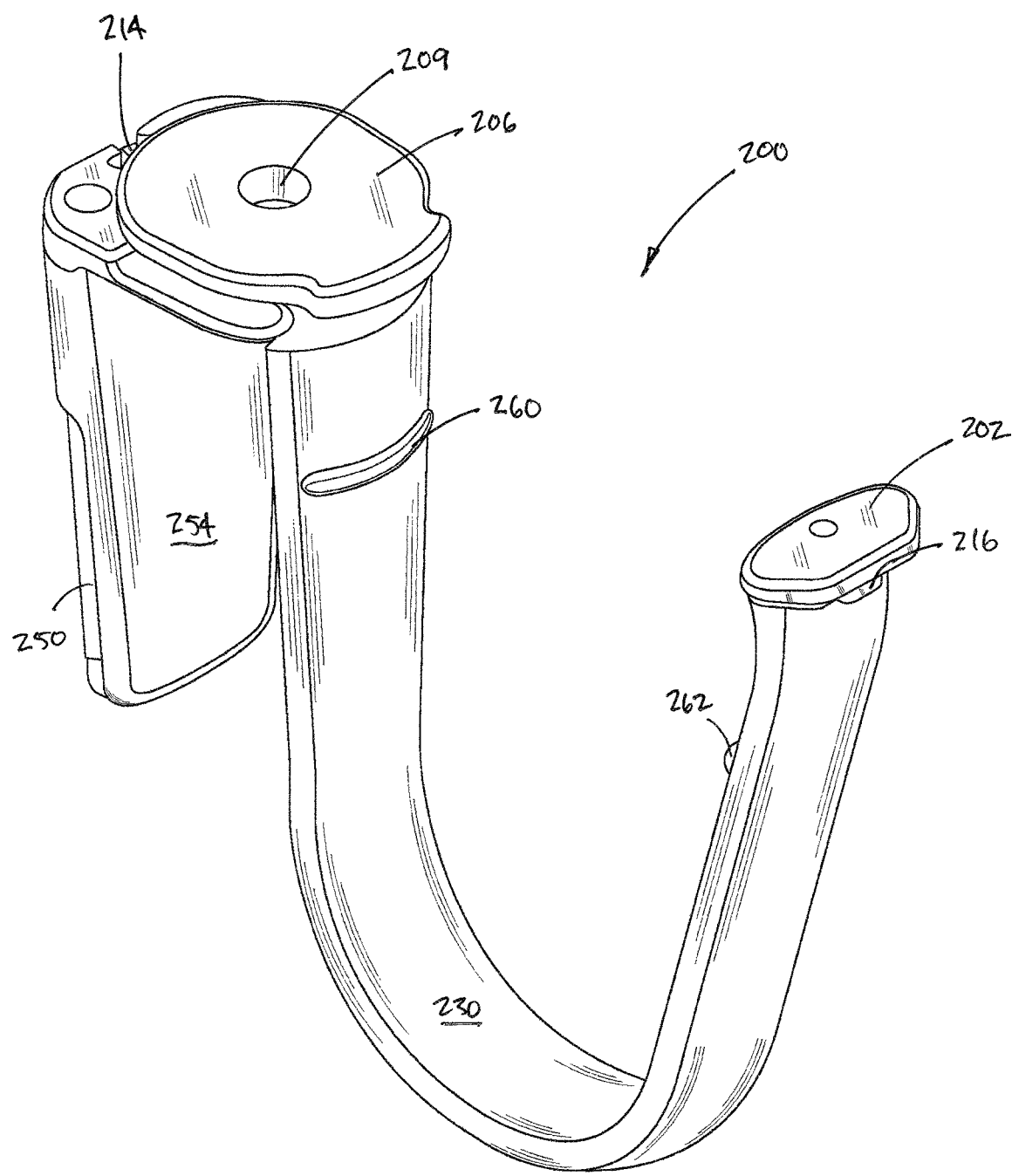
FIG. 7A shows a bag hook.
Figure 7B:
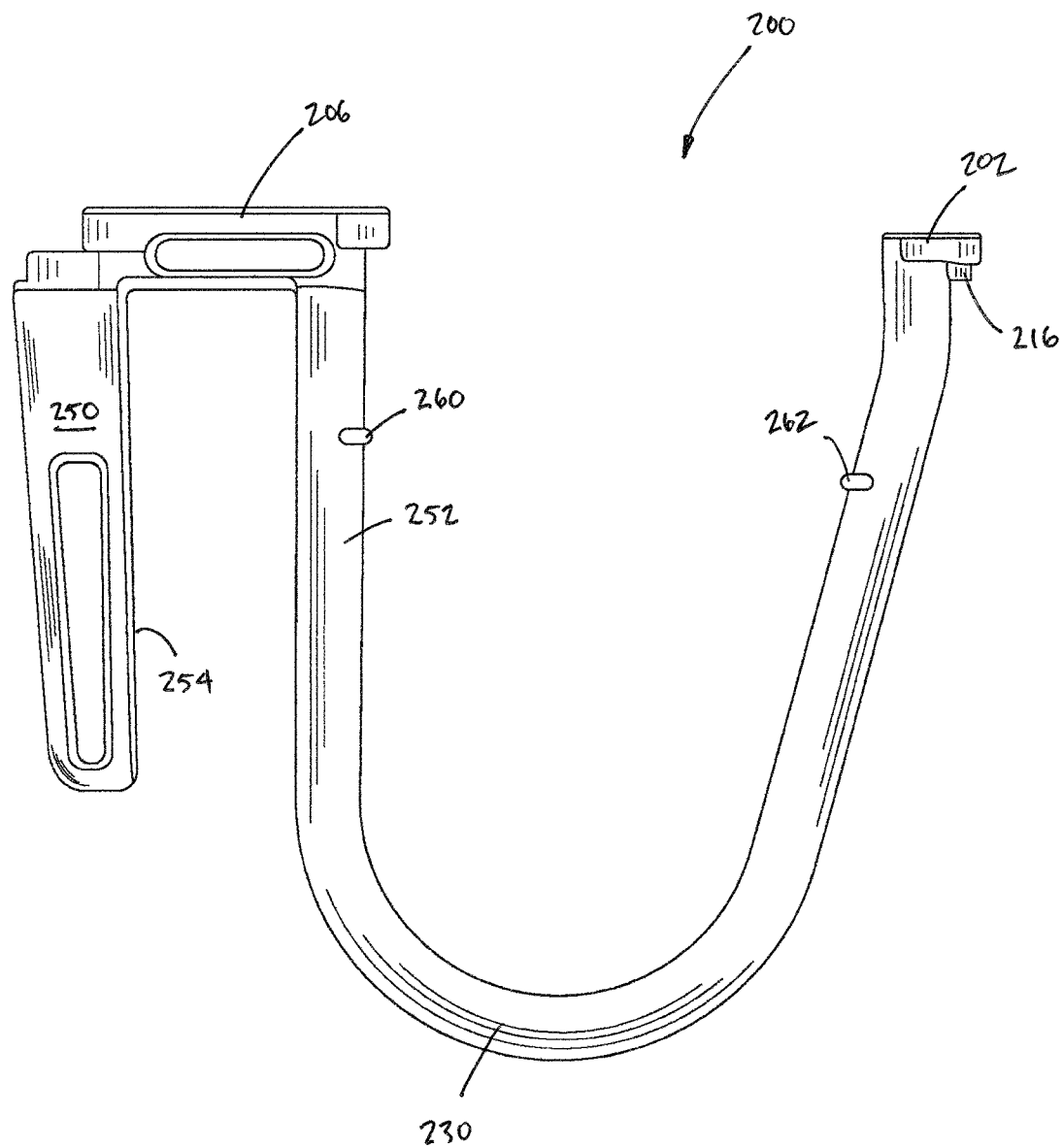
FIG. 7B shows a side view of the bag hook.
Figure 7C:
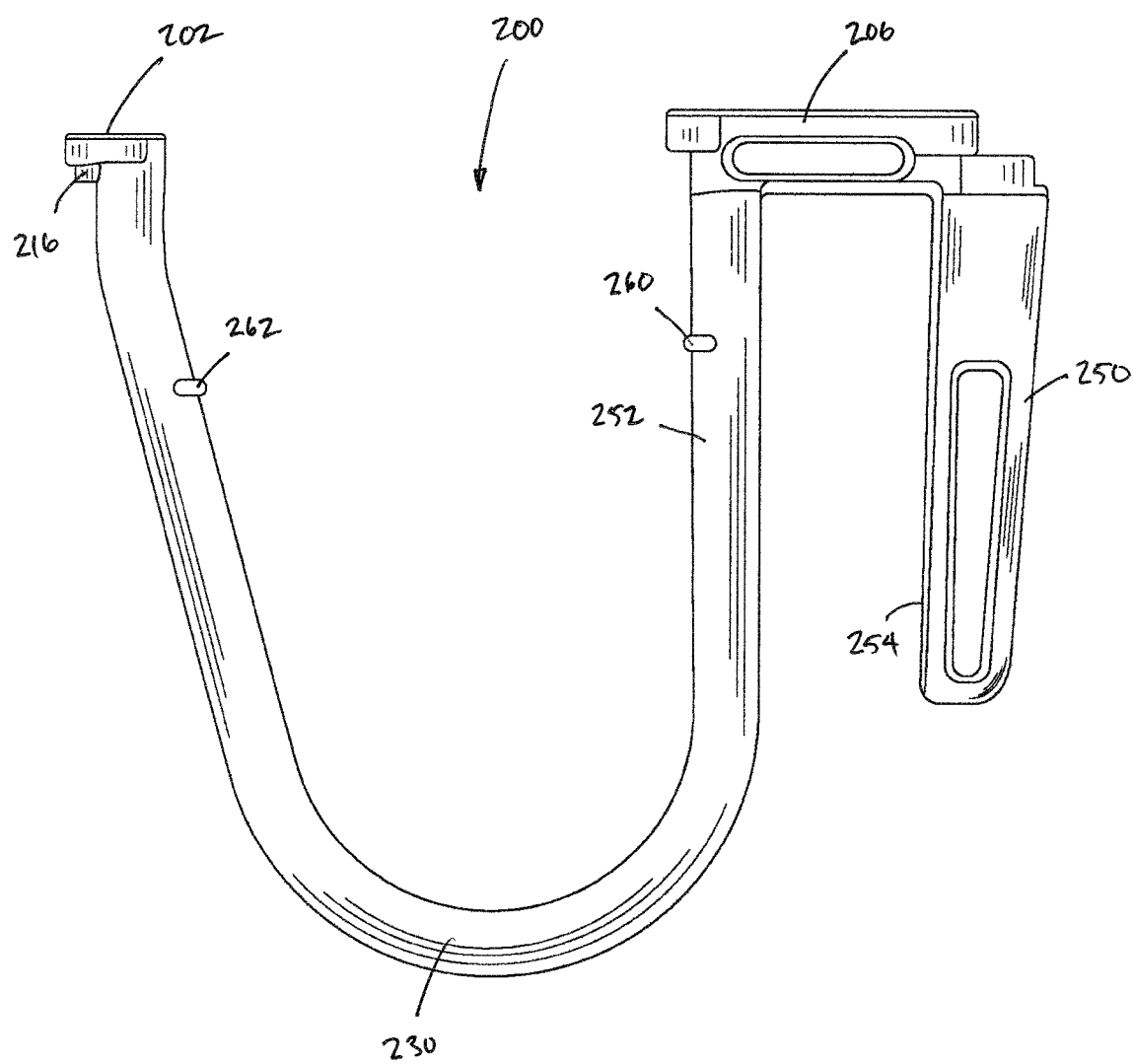
FIG. 7C shows the opposite side view of the bag hook of FIG. 7B.
Figure 7D:
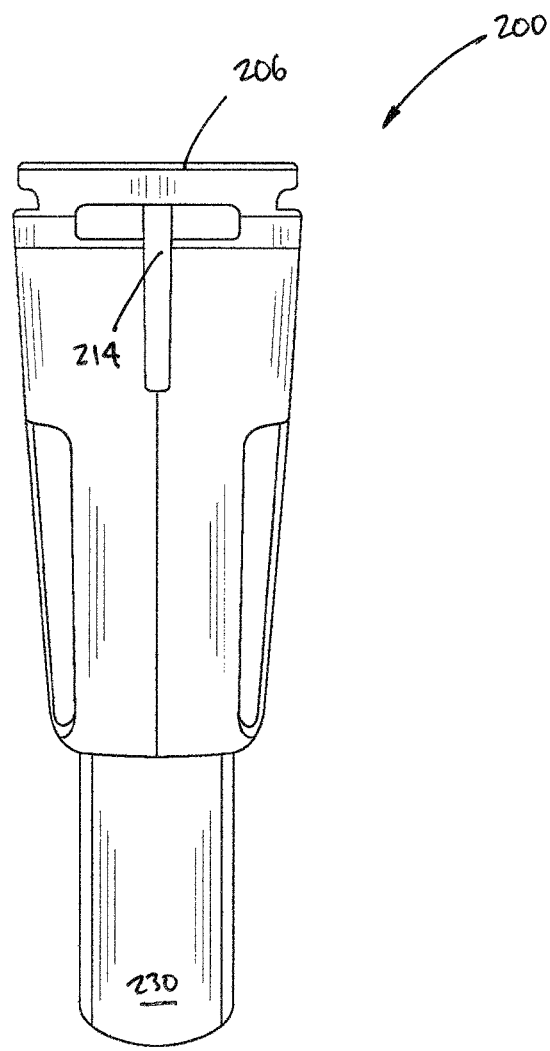
FIG. 7D shows a back view of the bag hook.
Figure 7E:
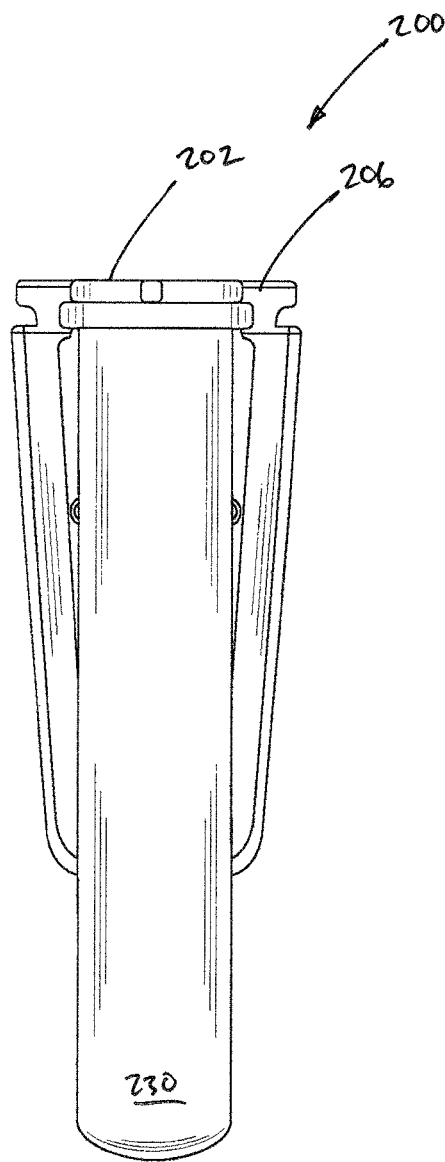
FIG. 7E shows a front view of the bag hook of FIG. 7D.
Figure 7F:
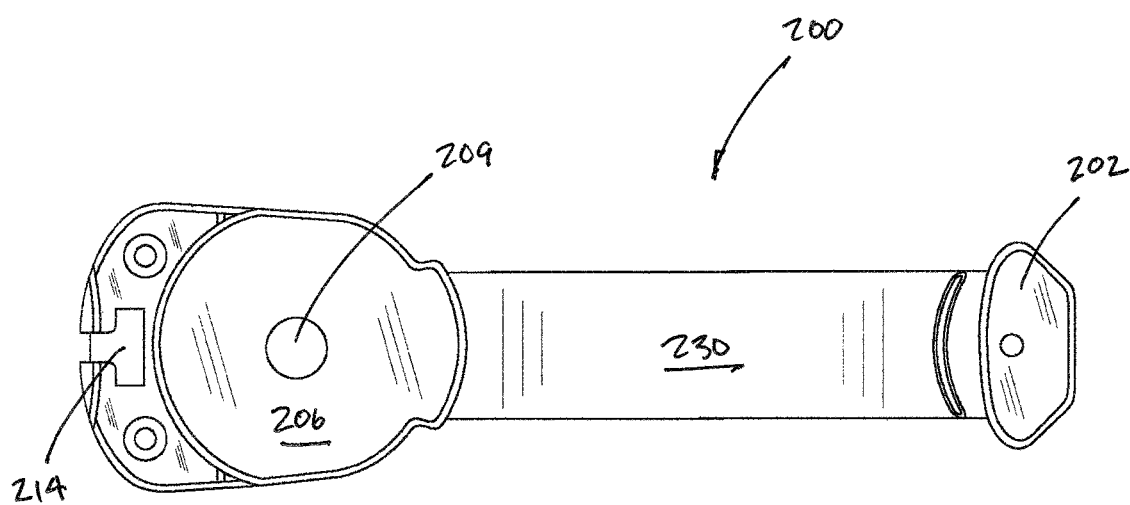
FIG. 7F shows a bottom view of the bag hook.
Figure 7G:
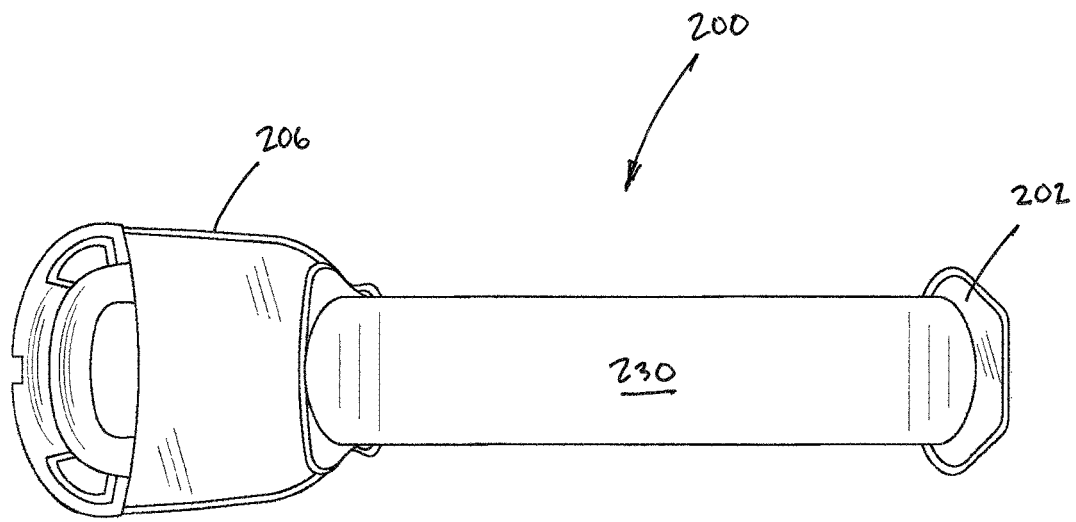
FIG. 7G shows a top view of the bag hook of FIG. 7F.
Figure 8A:
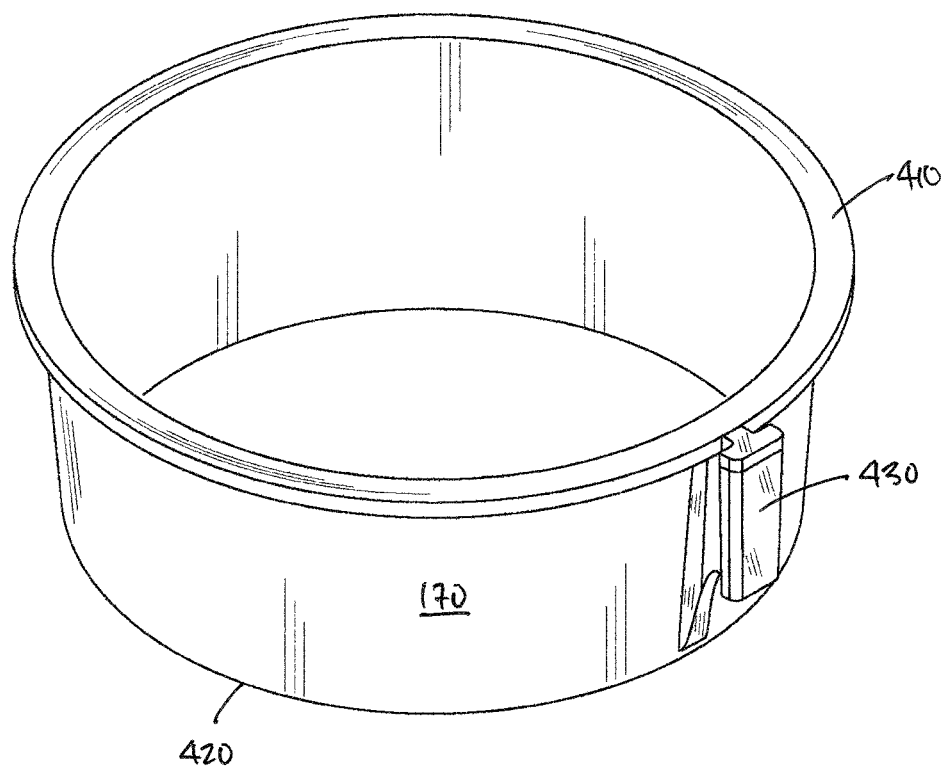
FIG. 8A shows a perspective view of a cup holder.
Figure 8B:
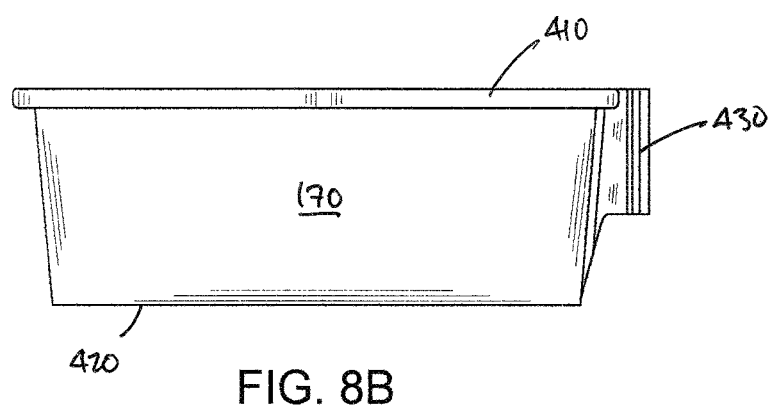
FIG. 8B shows a side view of a cup holder.
Figure 8C:
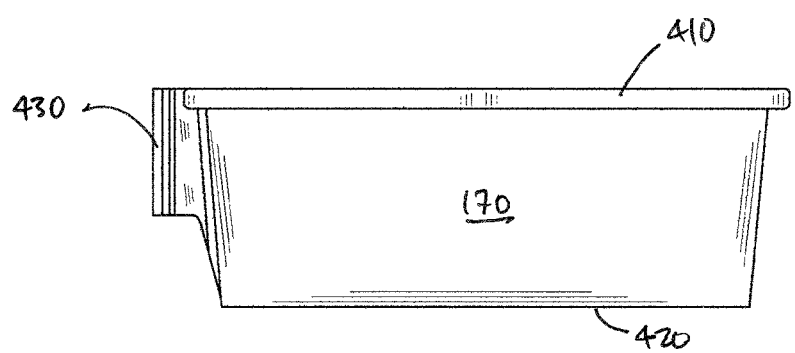
FIG. 8C shows an opposing side view of a cup holder.
Figure 8D:
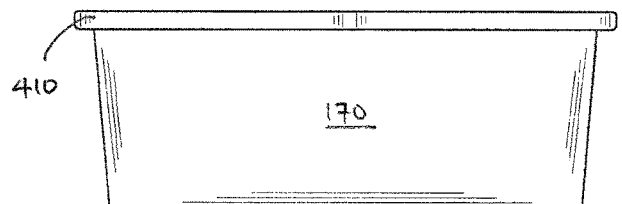
FIG. 8D shows a front view of a cup holder.
Figure 8E:
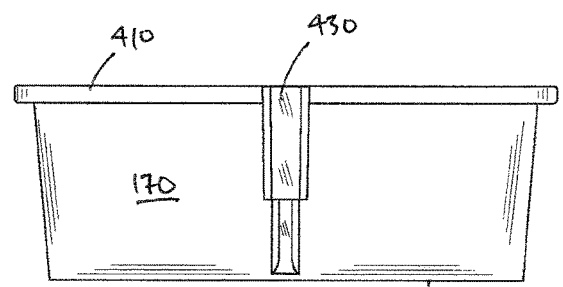
FIG. 8E shows a back view of a cup holder.
Figure 8F:
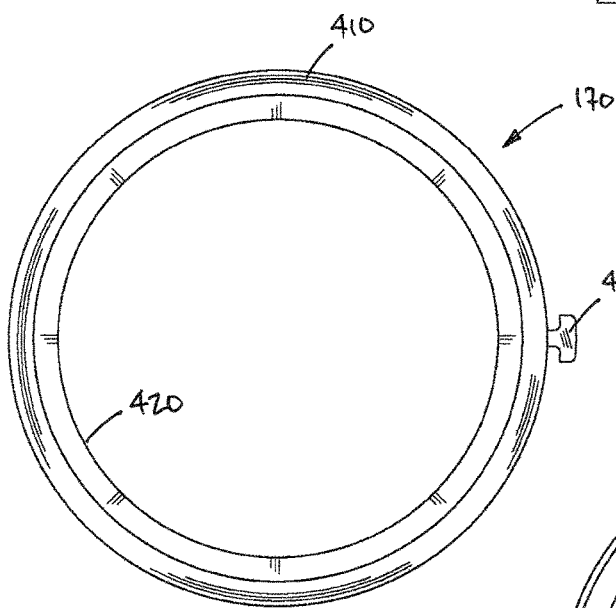
FIG. 8F shows a top view of a cup holder.
Figure 8G:
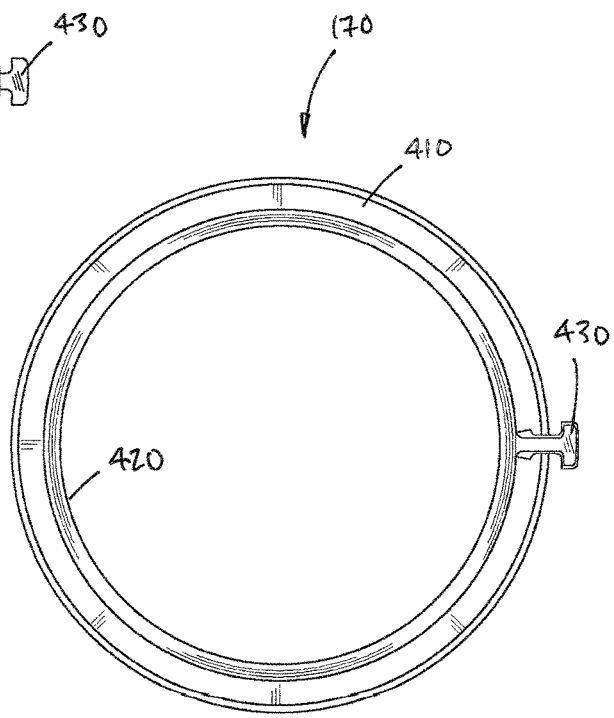
FIG. 8G shows a bottom view of a cup holder.
Figure 9A:
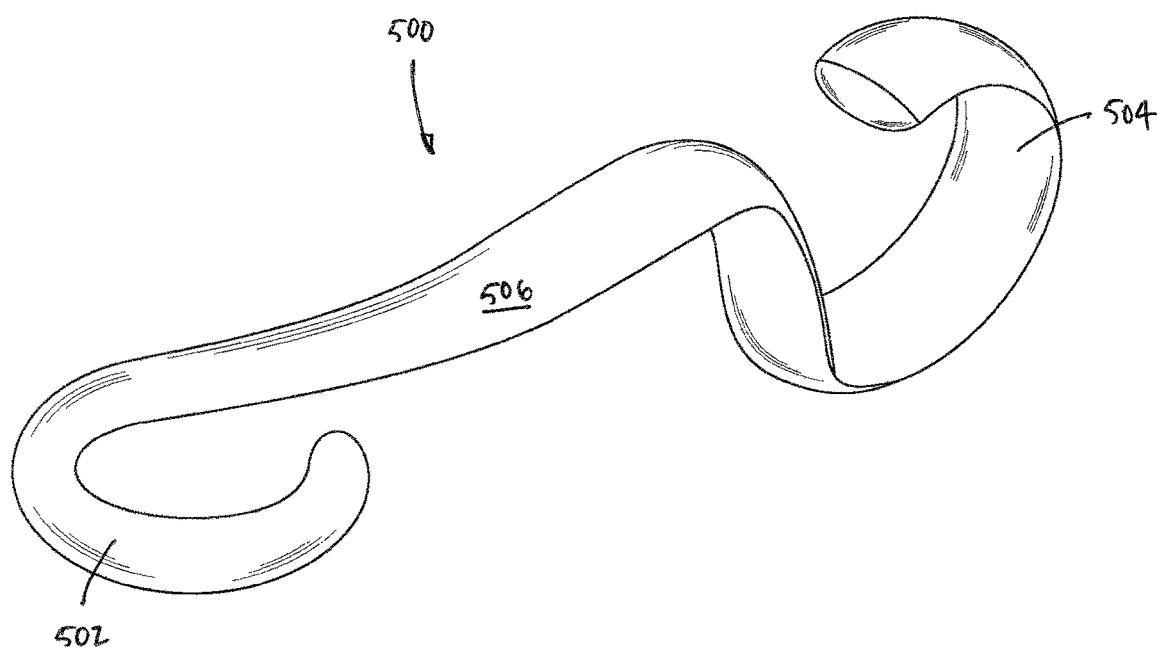
FIG. 9A shows a perspective view of a headrest storage hook.
Figure 9B:
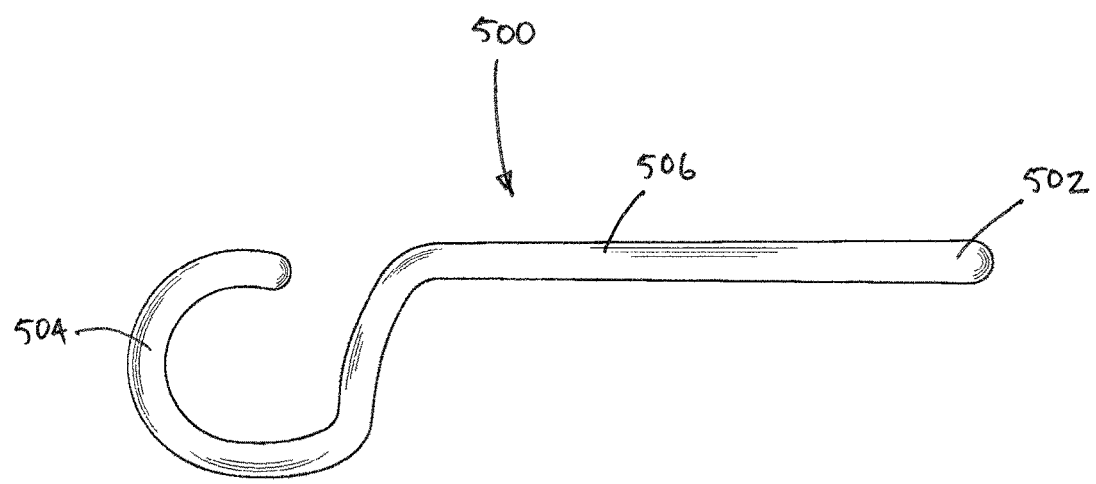
FIG. 9B shows a side view of a headrest storage hook.
Figure 9C:
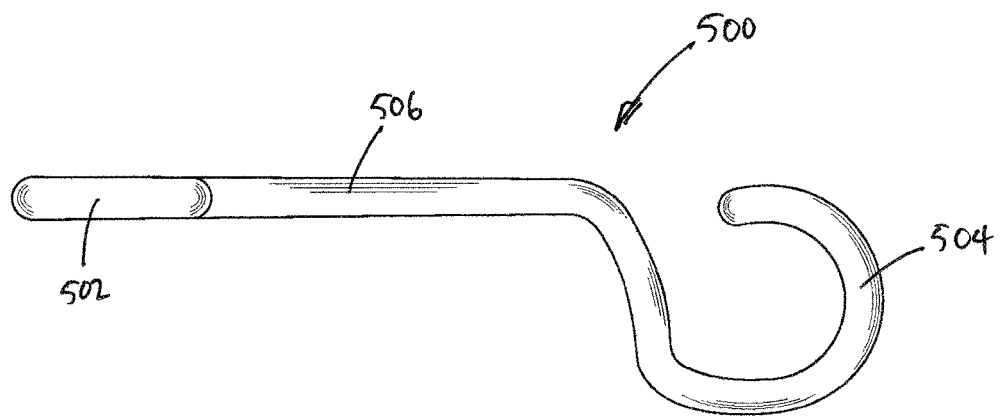
FIG. 9C shows an opposing side view of a headrest storage hook.
Figure 9D:
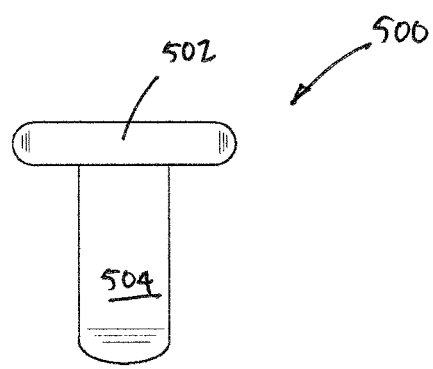
FIG. 9D shows a front view of a headrest storage hook.
Figure 9E:
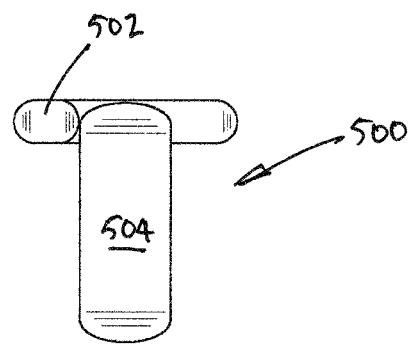
FIG. 9E shows a back view of a headrest storage hook.
Figure 9F:
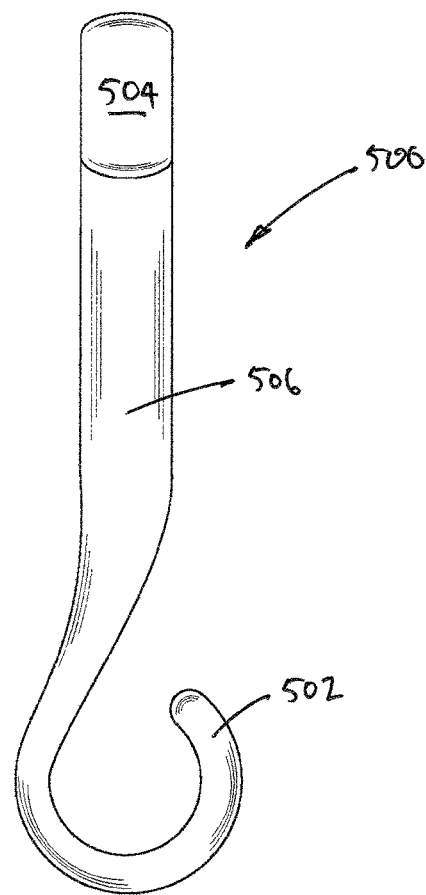
FIG. 9F shows a top view of a headrest storage hook.
Figure 9G:
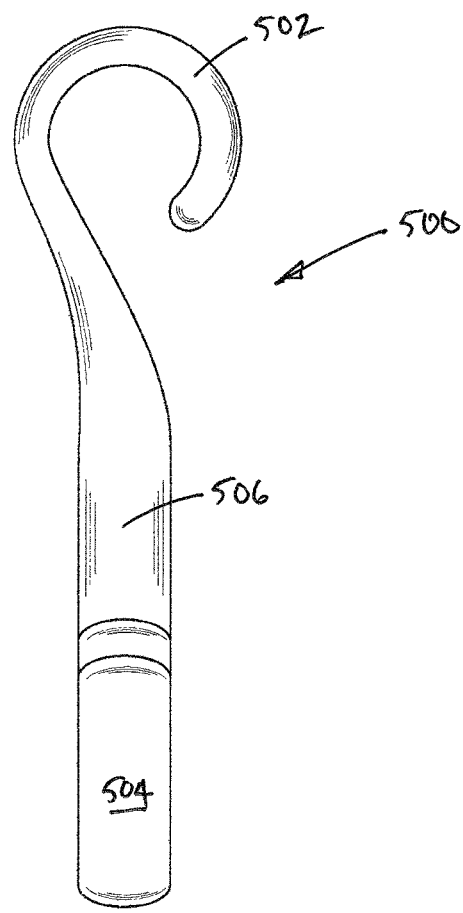
FIG. 9G shows a bottom view of a headrest storage hook.

When the twist handle 100 is twisted closed, the entrapment bay 110 may surround a portion of the bag hook 200 called the entrapment tooth 216 (see, e.g., FIGS. 7A-7C. The locking portion 202 of bag hook 200 may extend rotationally into the entrapment bay 110 and may include an entrapment tooth 216 which may be coupled by a slot 218 defined within the lock flange 120 of twist handle 100, as best shown in FIG. 6A. When the twist handle 100 is in the locked position, the entrapment tooth 216 rests within the slot 218 of the lock flange 120. and the bag hook 200 may not be rotated substantially clockwise or substantially counterclockwise until a user unlocks the twist hangle 100. by lifting the entrapment tooth 216 above and out of the slot 218 of the lock flange 120, see FIG. 5A illustrating the entrapment tooth 216 within slot 218 and FIG. 5B illustrating the entrapment tooth 216 being lifted out of slot 218 so that the locking portion 202 may rotate out of the entrapment bay 110.

The bag storage loop 230 may comprise the bulk of the bag hook 200 as it loops from the entrapment tooth 210 down and around back up to the rotation member 240. The bag storage loop 230 can hold one or even a large number and variety of bag handles (not shown) threaded thereon. Once the twist handle 100 is in a twisted closed, or locked, position on the bag hook 200, the bags may be locked onto the bag storage loop 230 and may not be removed without again twisting the twist handle 100 to gain access to the bags (not shown) on the bag storage loop 230.

The bag storage loop 230 may terminate into the rotation member 240. The rotation member 240 may be rotatably coupled with the rotation bay 140 and the two components may rotate relative to each other. Extending downwards from the other side of the rotation member 240 is the first cart member 250, which may have a substantially flat portion 254 and may have a length greater than the average bar used in a grocery cart on which the first cart member may be placed in frictional contact.

The first cart member 250 may be between 0.1 inches and 500 inches in length, may be between 0.1 inch and 5 inches in length, may be between 1 inch and 2 inches in length, may be between 2 inches and 4 inches in length, may be between 4 inches and 6 inches in length, may be between 6 inches and 8 inches in length. The first cart member 250 extends downward from the rotation member 240 of the bag hook 200 and is opposed to the second cart member 252, which may also extend downwards from the rotation member 240 of the bag hook 200. As defined herein the second cart member 252 may be substantially the same length of the first cart member 250, and the first cart member 250 and the second cart member 252 may be substantially parallel to each other, or in some preferred embodiments, the first cart member 250 may be slightly angled downwards at an angle between 0.1 degrees and 30 degrees from a horizontal line, such that a shopping cart bar may be wedged between the first cart member 250 and the second cart member 252 and one of the first cart member 250 and the second cart member 252 may flex to allow the shopping cart bar to be inserted and then may flex back to at or near the original position so as to grasp or hold the shopping cart bar. In some embodiments the length between the first car member 250 and the second cart member 252 is between 15 mm to 23 mm, wherein the difference between the first cart member 250 and the second cart member 252 at the top of the first cart member 250 compared to the bottom of the first cart member 250 is between 0.1 mm and 3 mm, and in some preferred embodiments is between 1 mm and 2 mm.

When suspending the rotatable hook assembly 10 from shopping cart walls of varying types and thicknesses, a suspension thickness buffer 300 may be incorporated into the gap between the first cart member 250 and the second cart member 252. The buffer 300 may be compressible or otherwise deformable so that it can fill any excess gap left after the rotatable hook assembly 10 is hung from a shopping cart wall, or sidewall 302, see FIGS. 2 and 3. Further, in the case of relatively thick sidewalls 302, buffer 300 needs to squeeze down and provide more space for the sidewall 302 in the gap. In order to function in this way in some embodiments, the buffer 300 may comprise a plurality of thickness adjusters, which may be the pieces that define channels of the suspension buffer 300 also known as the suspension thickness buffer 300.

Extending from a side of the first cart member 250 opposite the gap in which the shopping cart sidewall 302 can be placed, may be an optional lock in accessory (only one embodiment illustrated, namely cup holder 170). In the embodiment illustrated in FIG. 1, the lock in accessory is a cup holder 170. Other lock in accessories are contemplated (such as a cell phone holder, shelf for a wallet, etc., not shown). Referring now to FIGS. 8A-8G, the cup holder 170 can utilize a top edge cup holding lip 410 that provides a support surface to strengthen the cup holder 170 and support a cup (not shown) placed therein. At the bottom edge may be a reduced diameter ring 420 which squeezes down the diameter and so allows the cup holder 170 to firmly grasp a cup (not shown) placed therein.

Referring now to FIGS. 9A-G, a headrest storage hook 500 may be included with the rotatable hook assembly 10. The headrest storage hook 500 may have a first arcuate portion 502 and a second arcuate portion 504. The first arcuate portion 502 may be substantially perpendicular to the second arcuate portion 504, with a substantially linear portion extending between the first 502 and second 504 arcuate portions. Storage hook 500 can be hooked around a headrest upright support member 600 (see FIG. 4) or other object so that the rotatable hook assembly 10 can be used in the car (not shown) or anywhere a loop or hook receiver is located. Thus, storage hook 500 is not just limited to use on the sidewall 302 of a shopping cart 350.

Figure 1E:
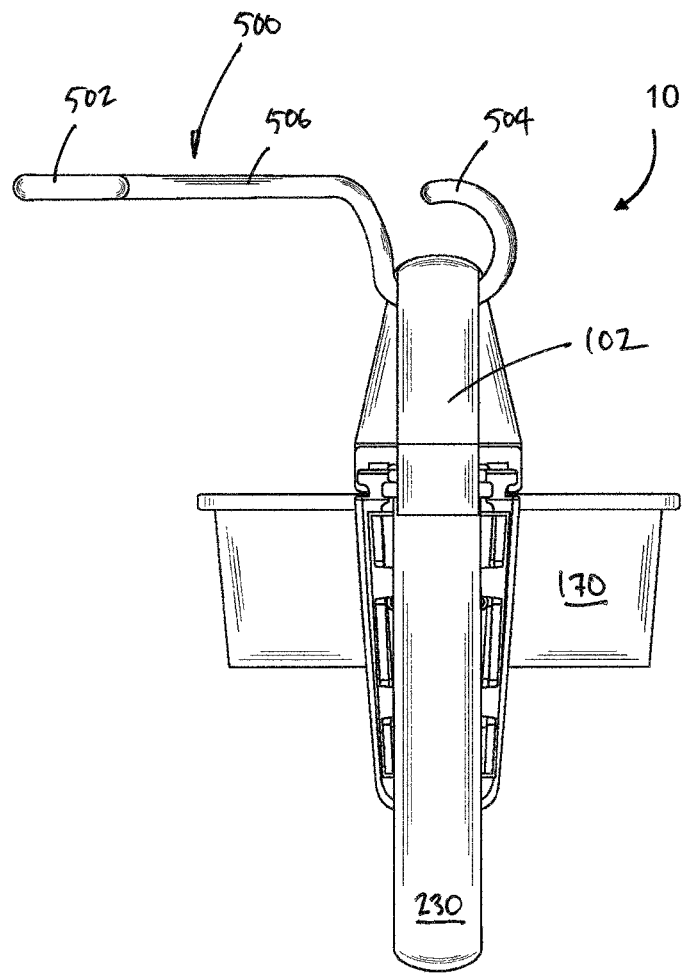
FIG. 1E shows a back view of a rotatable hook assembly.
Figure 4:
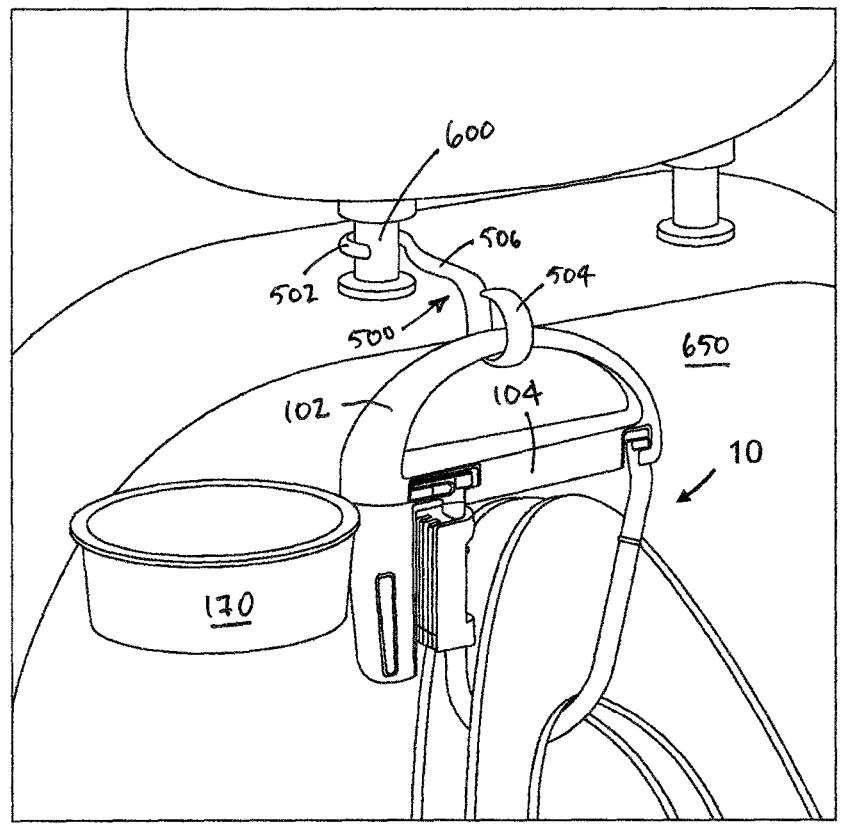
FIG. 4 shows a rotatable hook assembly wherein the headrest storage hook is coupled to a headrest and to the rotatable hook assembly.

FIG. 1E illustrates a rear elevation view of an exemplary embodiment of a rotatable hook assembly 10. In this view additional structural components of the headrest storage hook 500 are visible. For example, the substantially linear portion 506 is shown extending from the second arcuate portion 504 to the first arcuate portion 502. The headrest hook extension 500 provides additional room between the first 502 and second 504 arcuate portions so that the rotatable hook assembly 10 can rest somewhat vertically against the back of a car seat 650 (FIG. 4). The suspension buffer 300 may be made from silicone, rubber, or any other flexible material.

Figure 1F:
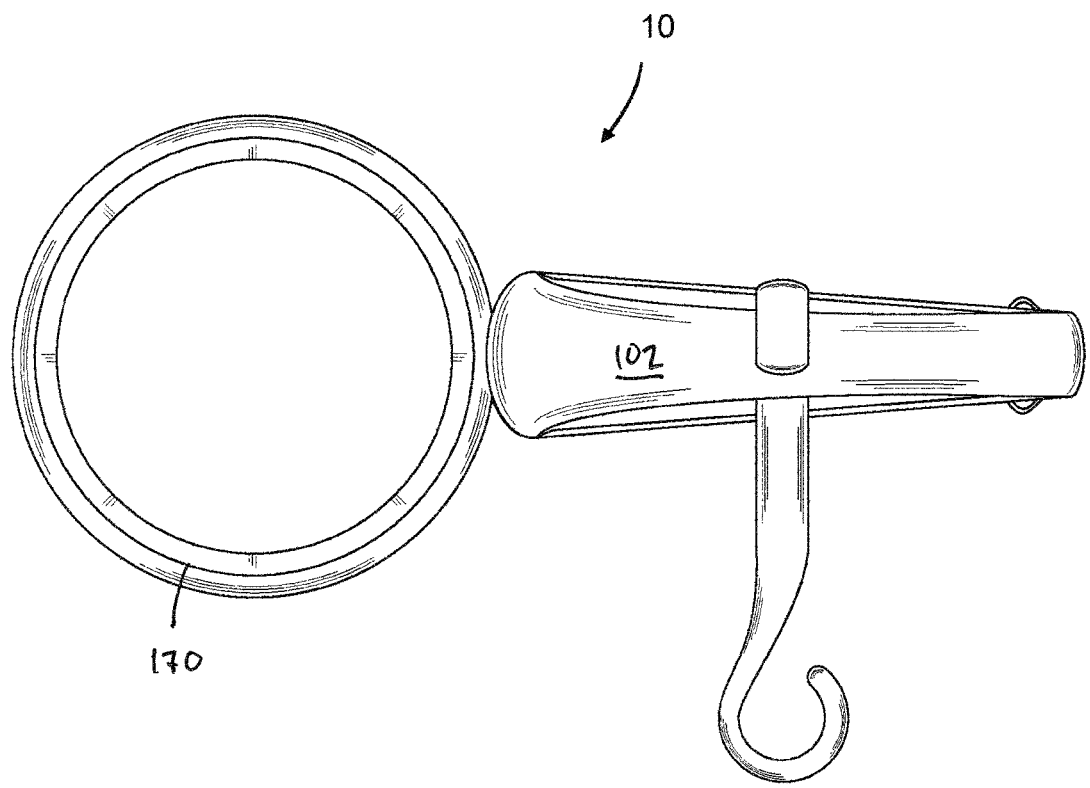
FIG. 1F shows a top view of a rotatable hook assembly.

FIG. 1F illustrates a top plan view of an exemplary embodiment of a rotatable hook assembly 10. This Figure provides an additional perspective on the rotatable hook assembly 10 such that the headrest storage hook 500 and cup holder lock in accessory 400 can be more clearly discerned. Additionally, it should be apparent that the headrest storage hook 500 is removable from the twist handle 100 simply by snapping the headrest hook attachment 520 off from around the handle 100.

Figure 1G:
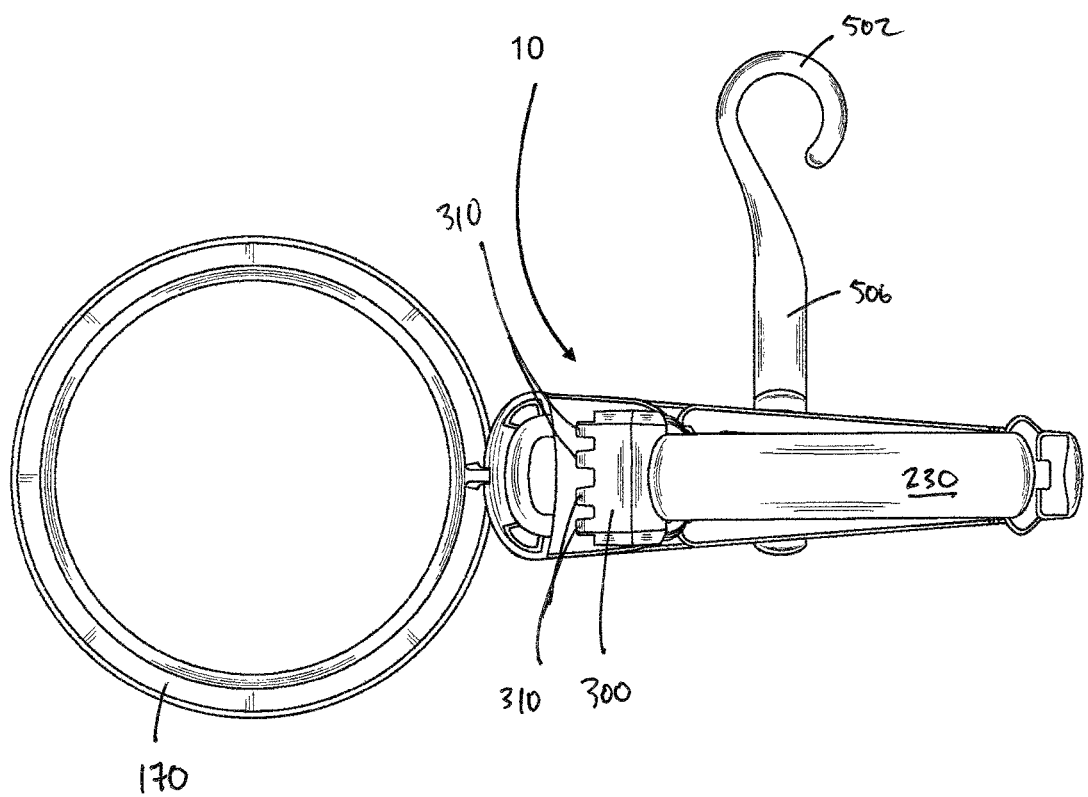
FIG. 1G shows a bottom view of a rotatable hook assembly.
Figure 1H:
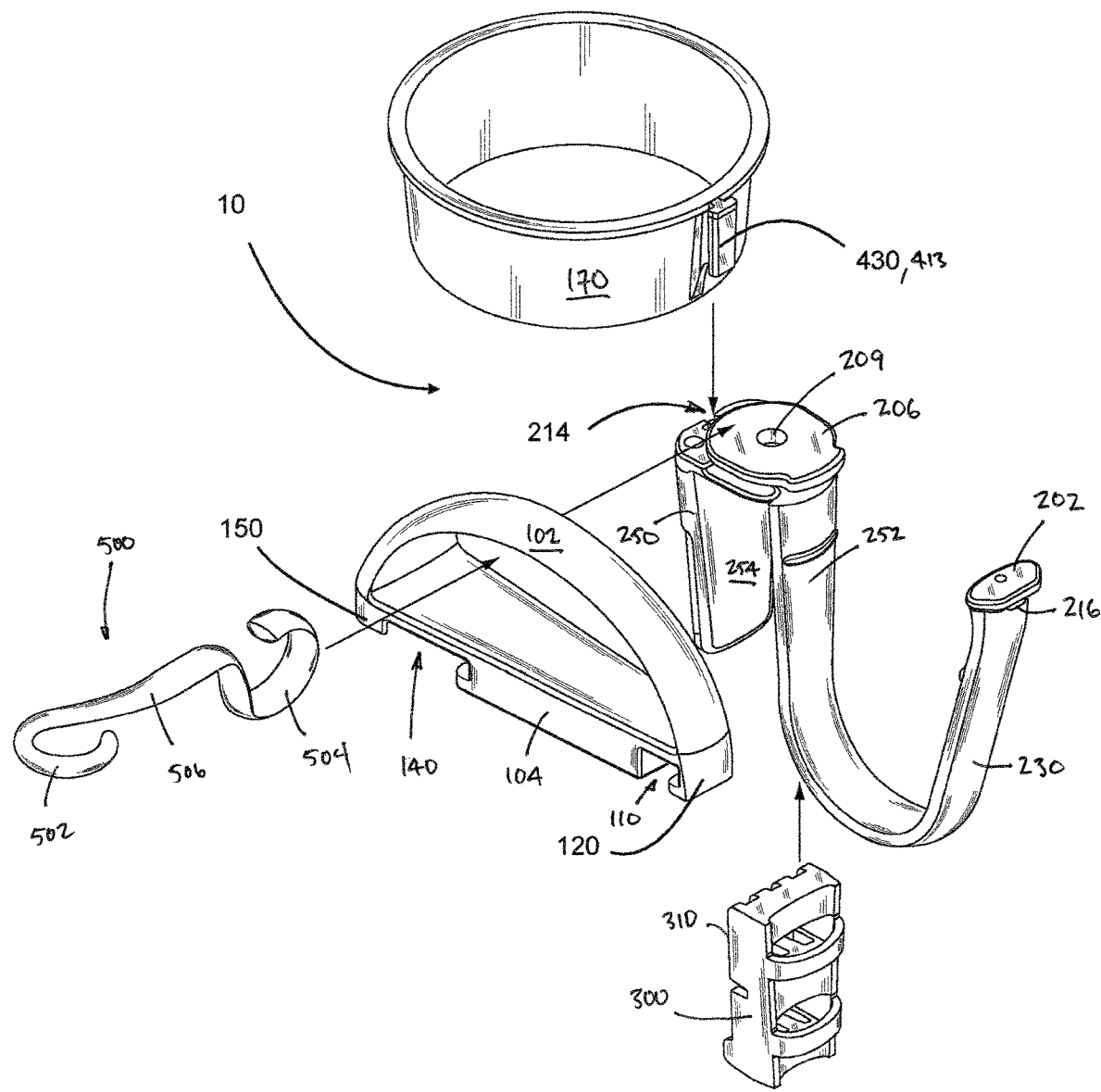
FIG. 1H shows a perspective, exploded view of a rotatable hook assembly.

FIG. 1G illustrates a bottom plan view of an exemplary embodiment of a rotatable hook assembly 10 which shows additional detail of the suspension thickness buffer 300, including the thickness adjusters 310 which are also described as pieces which define vertical or horizontal channels. FIG. 1H illustrates an exploded view of the various components of an exemplary embodiment of a rotatable hook assembly 10. Here, the various major components have been exploded out from one another so that their various shapes and functions can be more clearly discerned. In some embodiments there are a shown a plurality of thickness adjusters 310 on the suspension thickness buffer 300. Also, the accessory mount 430 on a lock in accessory, such as cup holder 170, may comprise a substantially T-shaped elongated member 413 configured to removably mate with the accessory mount receiver 214, which is a channel defined by a portion of the bag hook 200 and disposed within the channel, wherein the accessory lock of the twist handle may be configured to be in a locked position and thereby physically prevent the T-shaped elongated member disposed within the channel defined by the portion of the bag hook 200 from exiting the channel defined by the portion of the bag hook 200. Stated another way, the T-shaped elongated member 413 of the accessory mount receiver 214 slides to engage an accessory, for example cup holder 170, with the bag hook 200.

The rotatable hook assembly 10 may have rotation hardware, which may include a mounting member, which may comprise a bolt, screw, or other type of fastener in the preferred embodiments (not shown). Similarly, a friction member such as a simple washer and the accepting member, such as a threaded metal lock-nut type cylinder that can be affixed inside the twist handle 100 may be used; the threaded metal lock-nut type cylinder may accept the mounting member therein. In other embodiments other types of rotation hardware are contemplated. Basically, any sufficiently sturdy way of rotatably mounting the rotation member 240 within the rotation bay 140 can be used.

Figure 2B:
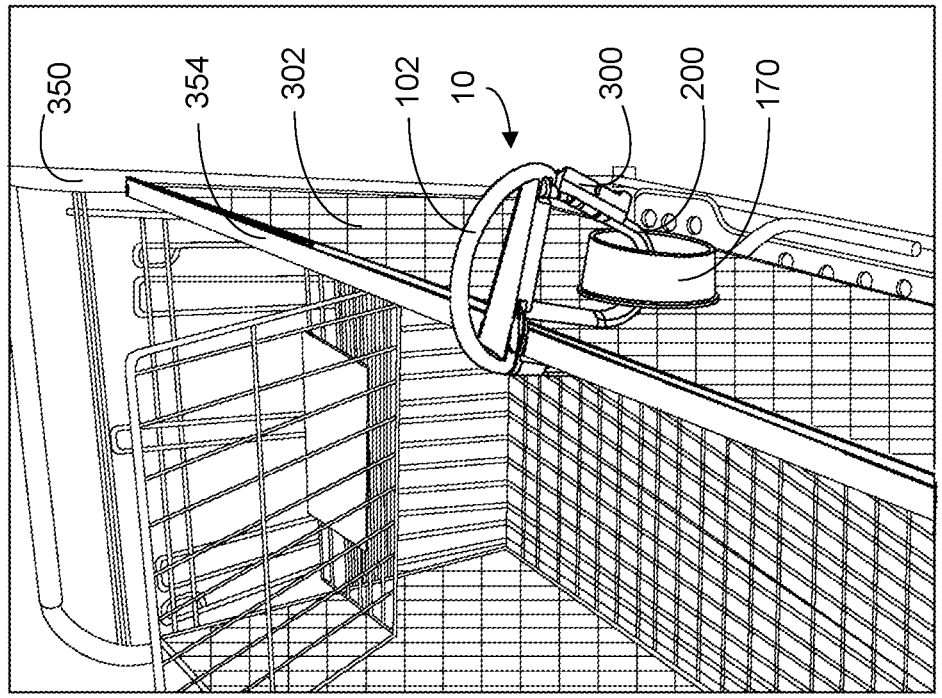
FIGS. 2A and 2B shows a rotatable hook assembly hooked to one or more bars of a shopping cart.
Figure 2A:
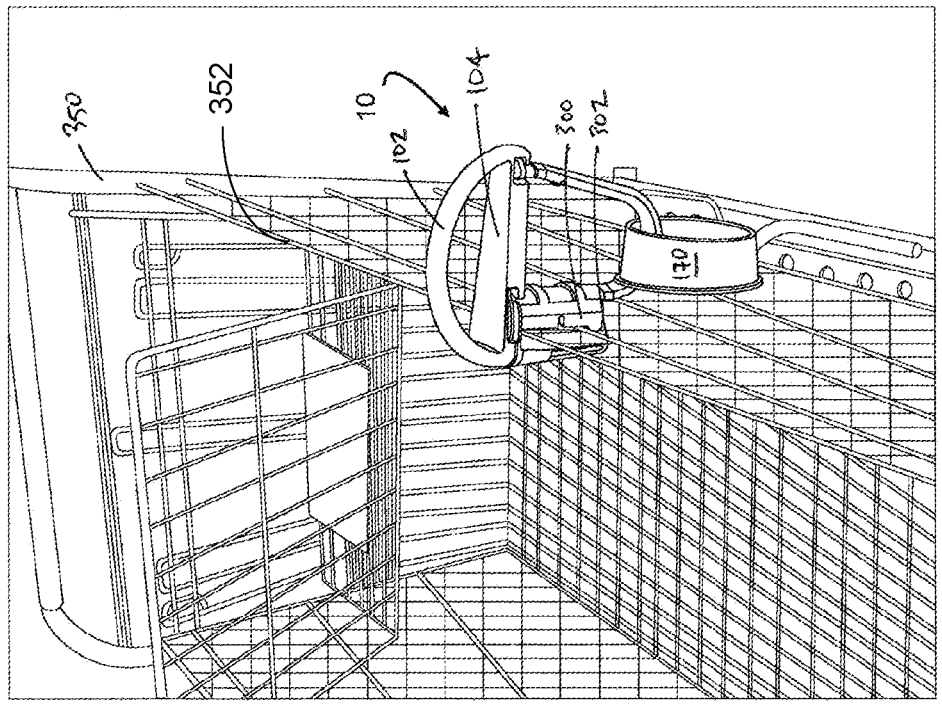
Figure 3:
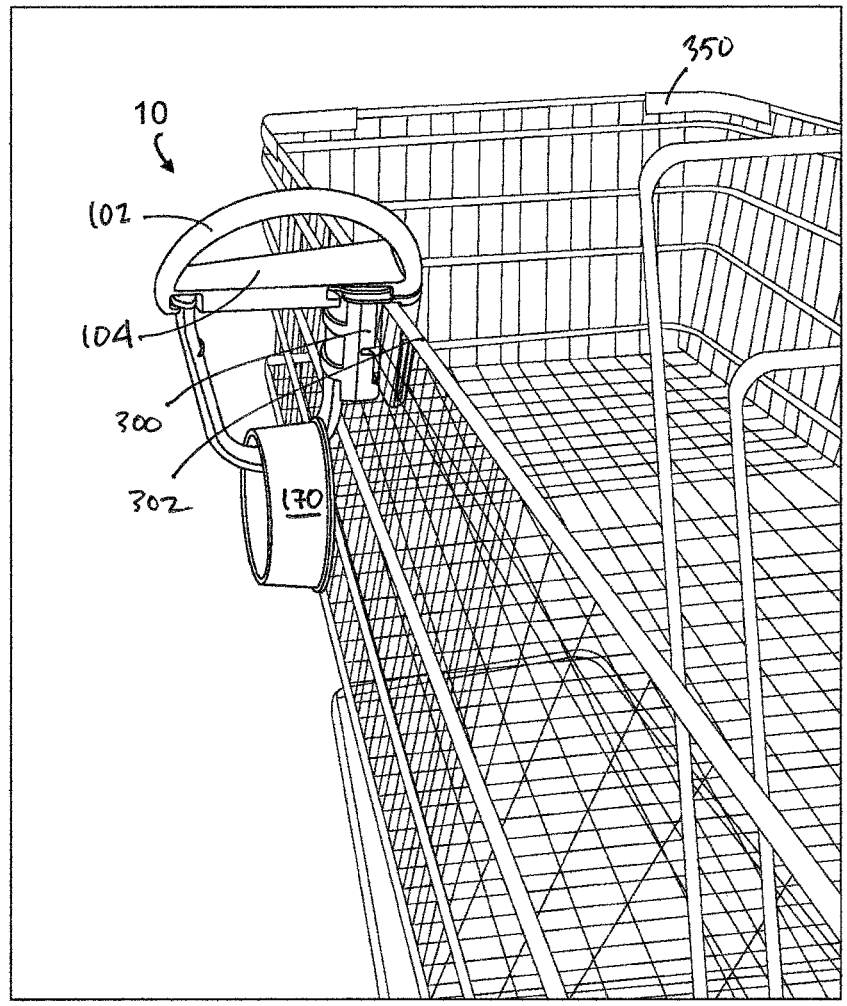
FIG. 3 shows a view from the other side of the rotatable hook assembly in shown in FIG. 2A.

FIGS. 2A and 2B illustrate perspective views of a rotatable hook assembly 10 attached to bars 352 and 354, respectively, of a shopping cart 350. More particularly in FIG. 2B, bar 354 on the cart wall 302 is larger than bar 352 shown in cart 350 of FIG. 2A. As shown in FIG. 2B, the suspension buffer 300 is positioned on the opposite end of the bag hook 200 from that shown in FIG. 2A. This is because of the thickness and larger size of bar 354 relative to bar 352, thus the suspension buffer 300 is not used to hold the rotatable hook assembly 10 securely to the shopping card 350. FIGS. 2A and 2B further illustrate grasp handle 102, bag hook 200, suspension buffer 300, shopping cart wall 302 and cup holder 170. FIG. 3 is another perspective view of FIG. 2A shown from the opposite side.

FIGS. 13 to 21F illustrate a second exemplary embodiment of a rotatable hook assembly 700. Referring to FIG. 14B, an embodiment of push-button mechanism 702 is shown in cross-section. In FIG. 14B, the button shaft 706 is also depicted in cross-section. Referring to FIG. 20A, a button shaft 706 is shown. Button shaft 706 may have a button receptacle 718, which may be substantially frusto-conical-shaped, or round or thimble-shaped. Button shaft 706 may have a button support 720, which may be substantially similar in shape to button receptacle 718. In some preferred embodiments the button support 720 is also frustoconical-shaped and has a front flat surface located at the proximal end 710 and is coupled to the back of the lock button 704 (see, e.g., FIG. 14B). Button shaft 706 may be rectangular in cross-section and may have substantially flat surfaces as shown in FIG. 20A. Shaft 706 may have one or more angled portions 722. The distal end of shaft 706 may have an end piece shaped like a wedge 714. the button shaft end piece, or wedge 714 may have an angled back portion 715 (see, e.g., FIG. 20A) and a substantially vertically aligned front portion 717 (see, e.g., 20A). In FIG. 14B a gap 718 is shown between the shaft 706 and the locking portion so that in the preferred embodiments the contour of the locking portion is such that it is in frictional contact with the button shaft wedge 714 and helped in place by the button shaft wedge 714.

Figure 21A:
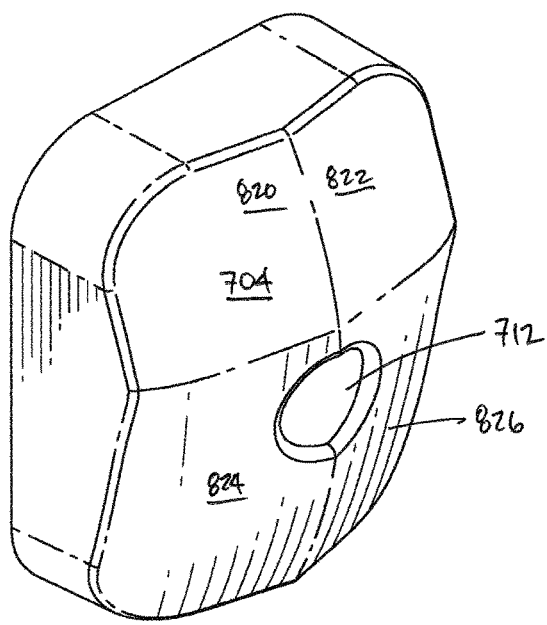
FIG. 21A shows a perspective front view of a button shell.
Figure 21B:
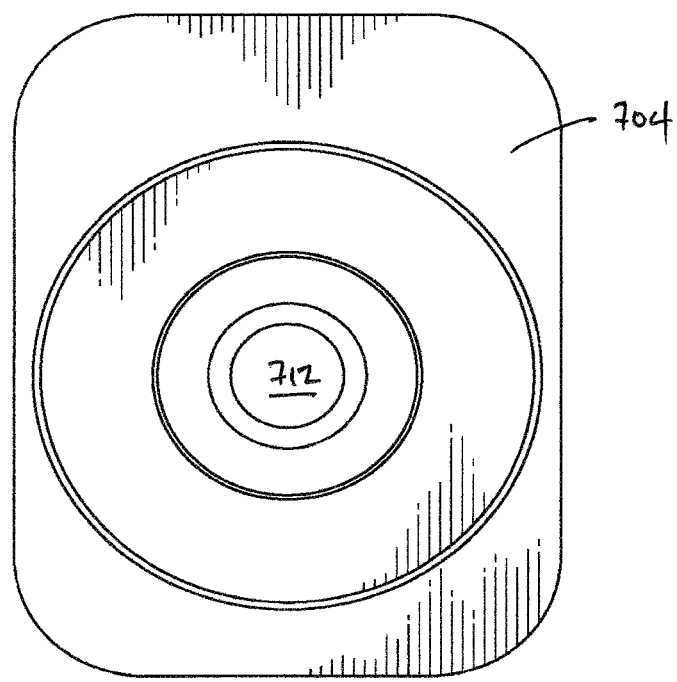
FIG. 21B shows a planar view of a button view as shown from the back.
Figure 21C:
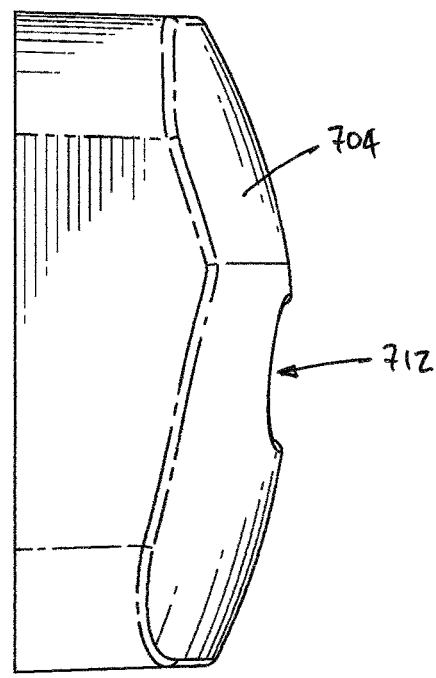
FIG. 21C shows a a side view of a button shell.
Figure 21D:
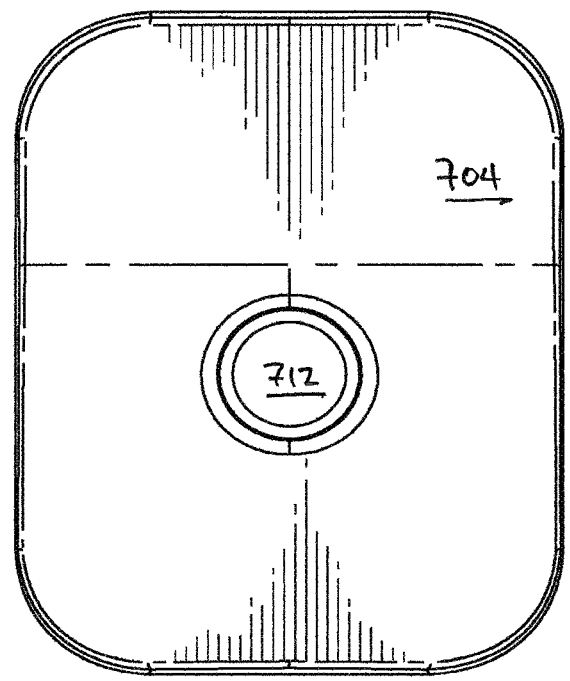
FIG. 21D shows a front view of a button shell.
Figure 21E:
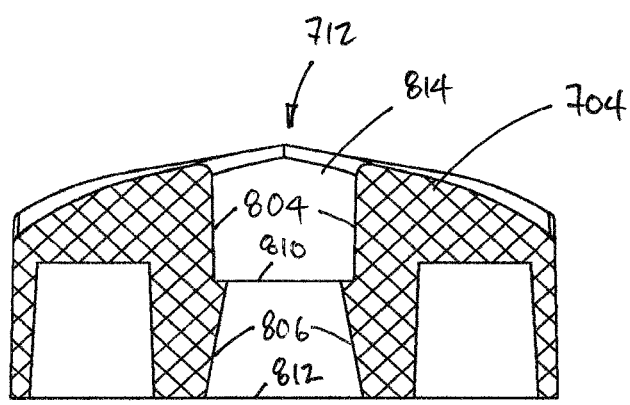
FIG. 21E shows a cross sectional view of the button shell of FIG. 21D with the line being from 51-51 and arrow showing direction of the view.
Figure 21F:
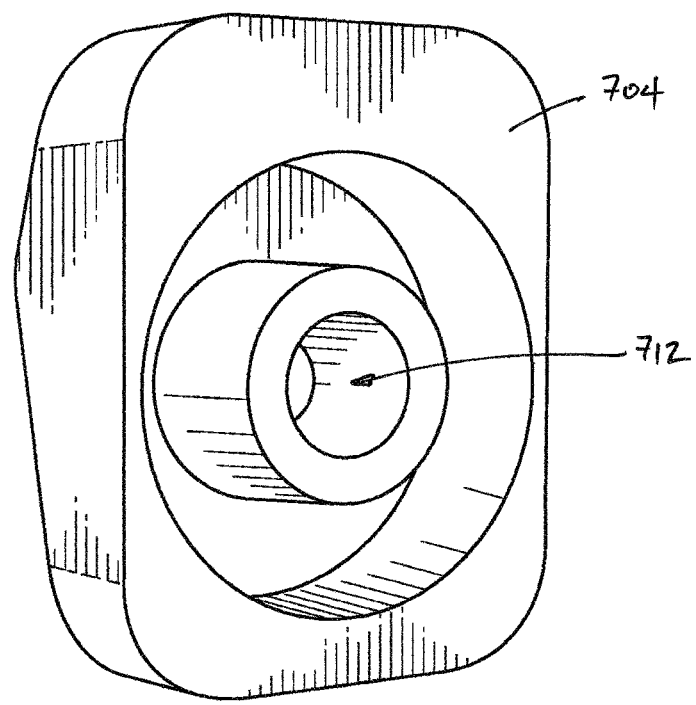
FIG. 21F shows a back perspective view of the button shell.

FIGS. 21A to 21F illustrate various views of an embodiment of a lock button 704 for use with the rotatable hook assembly 700. Lock button 704 may include a centrally positioned, substantially circular or round void 712 that is large enough for button receptacle 718 to protrude from. Half of a button shell 800 is shown in FIG. 21E, 700 due to being a cross-sectional view. Lock button 702 may have a first button support member 804 which may be frictionally coupled to the button support 720 and a second button support member 806 which may be fictionally coupled to the button receptacle 718. The first button support member 804 may have a first rim 810. The second button support member 806 may have a second rim 812. The button shell 800 may have a front chamber defining member 814 which defines a chamber for the button receptacle 718. The front chamber defining member 814 may be circular or substantially circular in shape. As shown best in FIG. 21A, lock button 704 may have an upper left face 820, an upper right face 822, a lower left face 824 and a lower right face 826. When a user presses on one or more of the upper left face 820, an upper right face 822, a lower left face 824 and a lower right face 826 of the lock button 704, the lock button 704 engages the button receptacle 718 or button support 720 at either the second rim 812 or first rim 810, respectively, thereby pushing the button shaft 706 backwards such that the button shaft wedge 714 no longer locks the locking portion 2202 in place such that the locking portion 2202 is free to be rotated counterclockwise or clockwise such that the bag hook 2000 may be rotated open thereby allowing access to the bag storage loop 2230.

In some embodiments, a user may press on the lock button 704 such that the button 704 exerts pressure on the button support 720, and the button shaft 706 is moved backwards thereby disengaging the button shaft wedge 714 from the locking portion 2202 of the bag hook 2000. In some embodiments, a coil, spring 708, or spring member may be positioned in a chamber defined by the back portion of the lock button 704 within the twist handle 100. The spring 708 may be useful for returning the lock button 704 to its starting position after the lock button 704 has been moved to the rightward direction (with respect to FIG. 14B). When the lock button 704 is returned to its original position by the decompression of the spring 708, the original position being shown in FIG. 14B, then the button shaft wedge 714 may be brought closer or sufficiently close to the locking portion 202 in which the lock button 704 may be frictionally engaged with the button shaft wedge 714. The spring 708 may be coupled around a portion of the main body of the button shaft 706 and may be partly coiled so as to be disposed inside of a portion of the lock button 704.

Figure 19A:
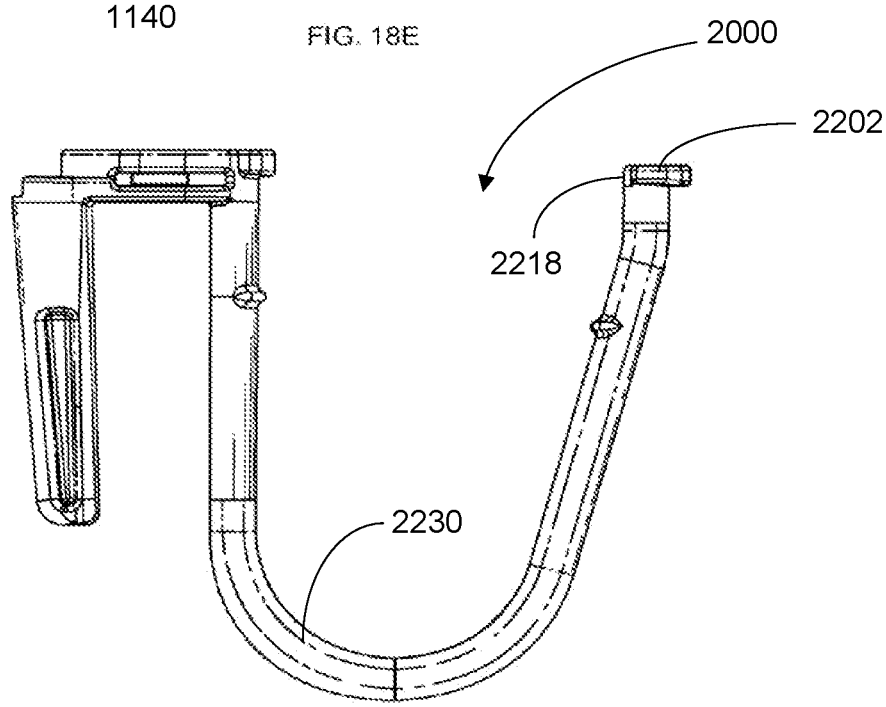
FIG. 19A shows a side view of a bag hook.
Figure 19B:
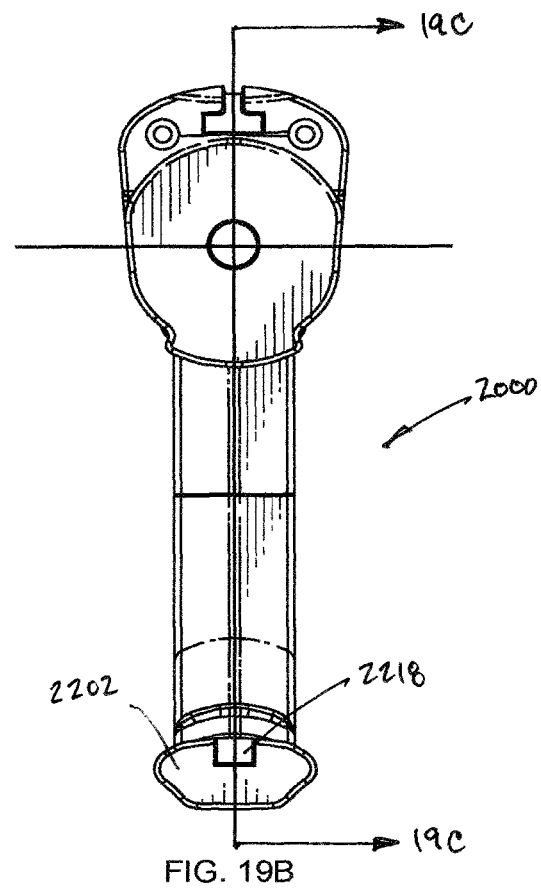
FIG. 19B shows a bottom view of the bag hook shown in FIG. 19A.
Figure 19C:
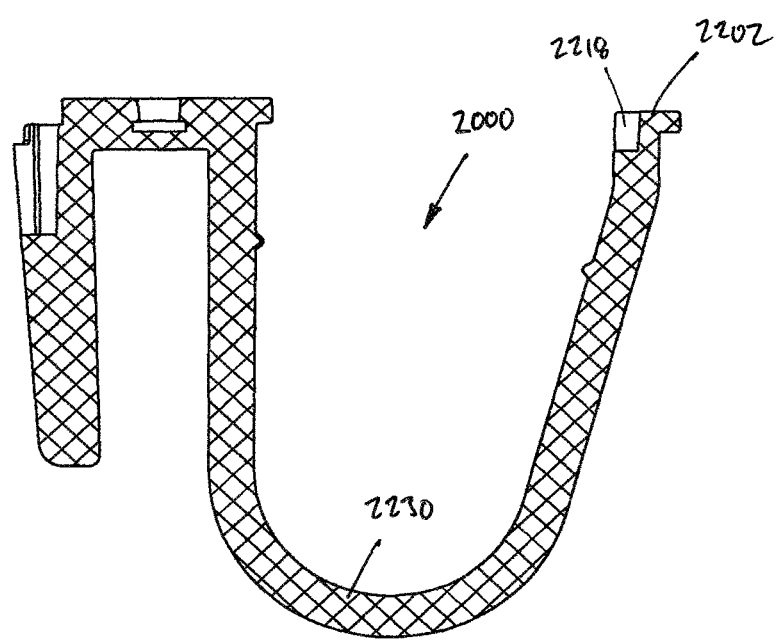
FIG. 19C shows a cross sectional view of the bag hook of FIG. 19B, the cross section be taken at 47-47 with the arrow showing the direction of the view.
Figure 19D:
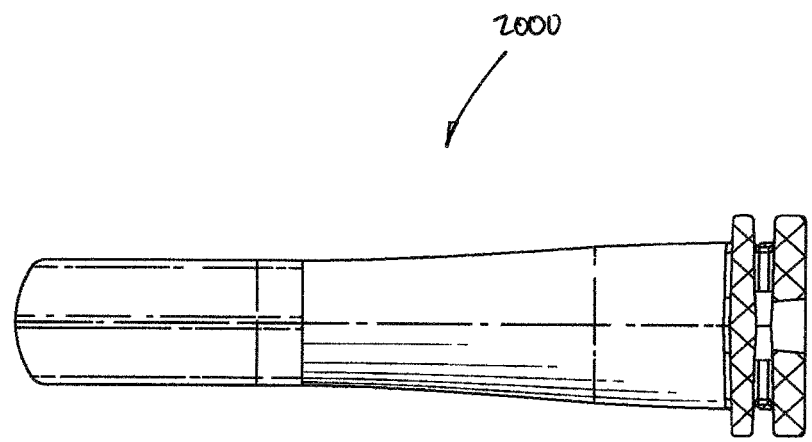
FIG. 19D shows a cross sectional view of FIG. 49B with the line drawn from 49-49 and the direction of the view is at the single arrow located near 49.
Figure 19E:
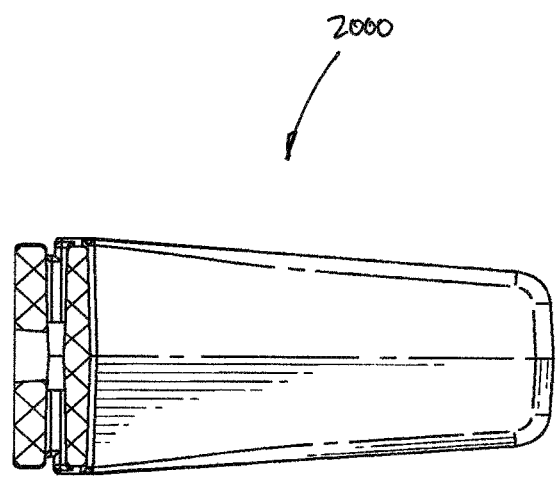
FIG. 19E shows a cross sectional view of FIG. 49B with the line drawn from 49-49 and the direction of the view is at the double arrow.
Figure 20A:
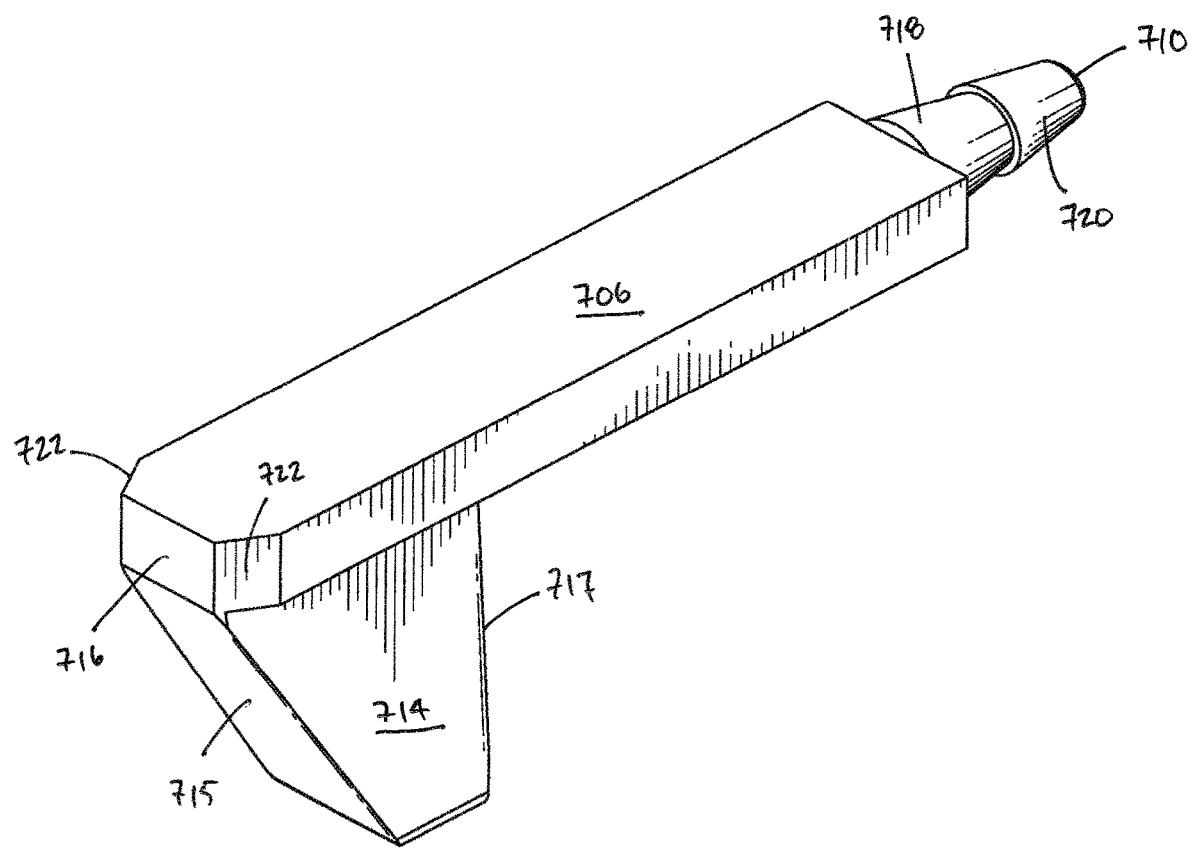
FIG. 20A shows a button shaft from a perspective view.
Figure 20B:
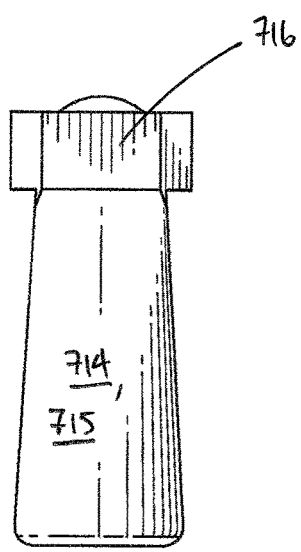
FIG. 20B shows a back view of the button shaft of FIG. 20A.
Figure 20C:
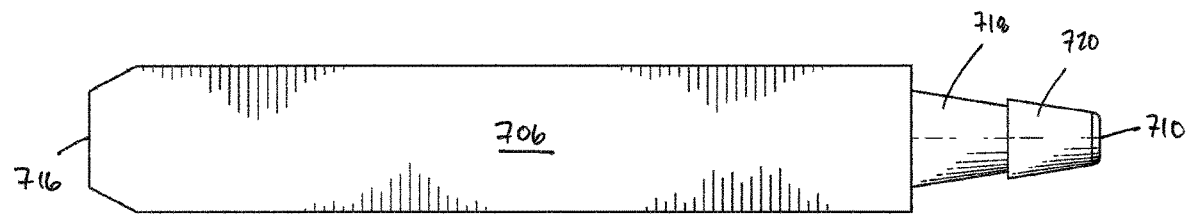
FIG. 20C shows a top view of the button shaft of FIG. 20A.
Figure 20D:
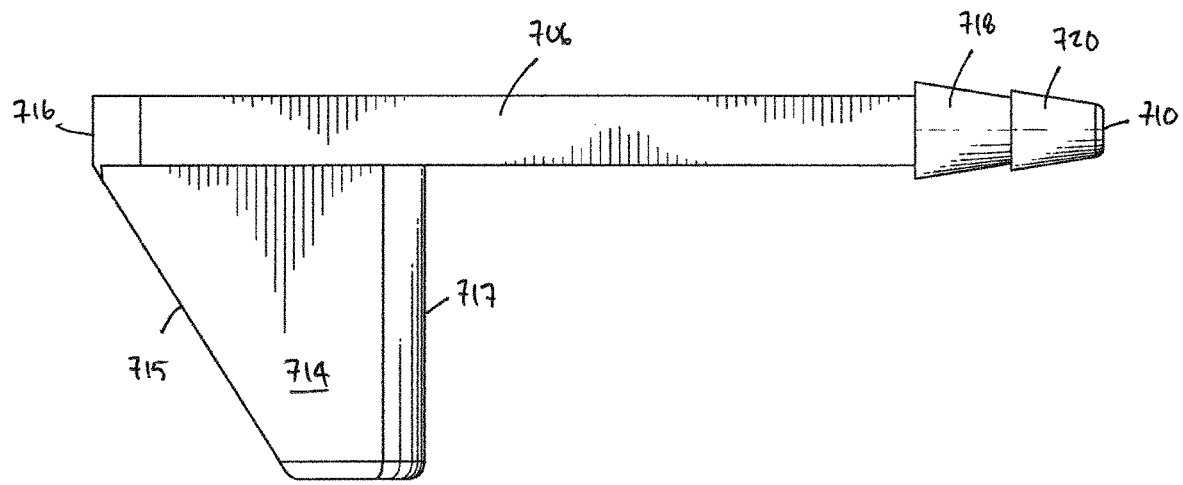
FIG. 20D shows a side view of the button shaft of FIG. 20A.
Figure 20E:
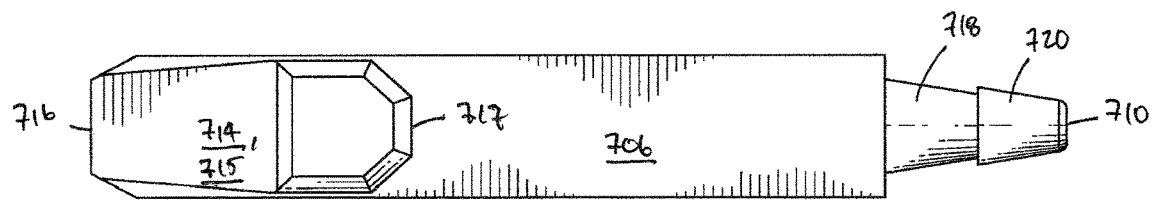
FIG. 20E shows a bottom view of the button shaft of FIG. 20A.

Referring to FIGS. 10A to 10H, the suspension buffer 300 may have one or more back band members 906, 908 which may be used to rest upon one or more back band member ridges 260, 262 of the bag hook 200, see FIGS. 7A to 7C. A distal back band member ridge 262 is depicted in FIG. 19A, as also a proximal back band member ridge 260. However, some embodiments have a second distal back band member ridge (not shown in the drawings) located from the first distal back band member ridge 262 at a distance substantially equal to the distance between the two back band members 906 and 908. Additionally, some embodiments have a second proximal back band member ridge (not shown in the drawings) located at a distance from the first proximal back band member ridge 260 at a distance substantially equal to the distance between the two back band members 906 and 908.

Referring again to FIGS. 10A to 10H, the suspension buffer 300 may have at least one substantially horizontal channel 940 and at least three substantially vertical channels 950, see particularly FIG. 10A. In the preferred embodiment shown in FIGS. 10A to 10H the suspension buffer 300 may have three vertical channels 950. Referring to FIG. 10F, an inner portion 960 of the suspension buffer 300 may be contoured to be arcuate to fit the contour of the bag hook 200 upon which it rides. Referring back to FIG. 10D, the suspension buffer 300 may have one bottom end 912 that is narrower than the top end 914. In some embodiments the top end 914 is narrower than the bottom end 912 (not shown in the drawings). In some embodiments four buffer ridge pieces 917*a-d* of the suspension buffer 300 may extend out from the main surface of the suspension buffer so as to form a suspension buffer ridge 916 (see FIG. 10F with four buffer ridge pieces 917*a-d* that extend).

However, in some embodiments, see for example FIGS. 11A-11H, the suspension buffer ridge 916 is not present since the four buffer ridge pieces (917*a*, 917*b*, 917*c*, and 917*d*) are not present. FIGS. 11A-H illustrate an alternative embodiment of a suspension buffer 300B, wherein suspension buffer ridge 916 has been removed.

Figure 10A:
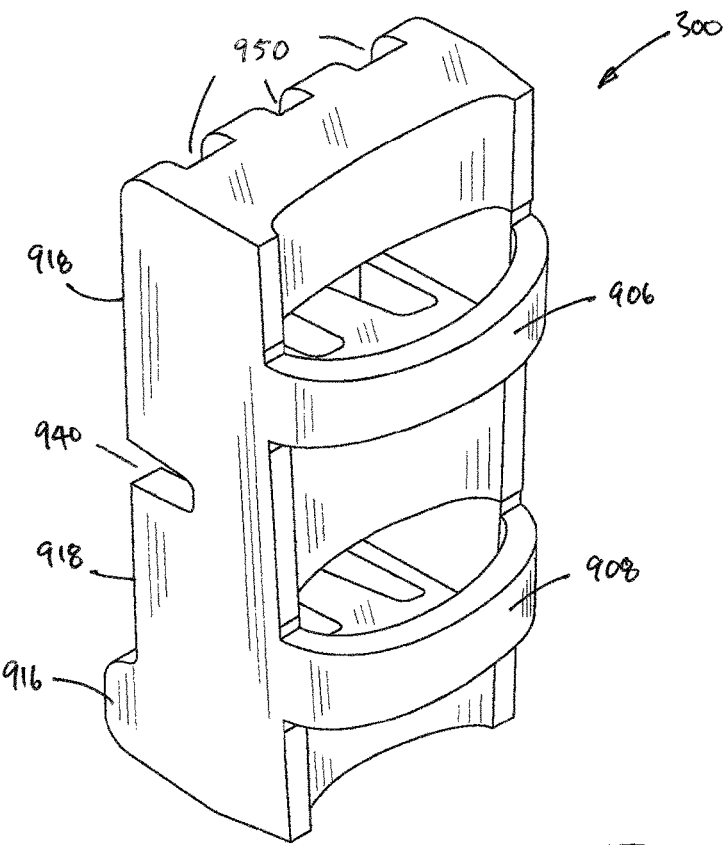
FIG. 10A shows a perspective view of a suspension buffer.
Figure 10B:
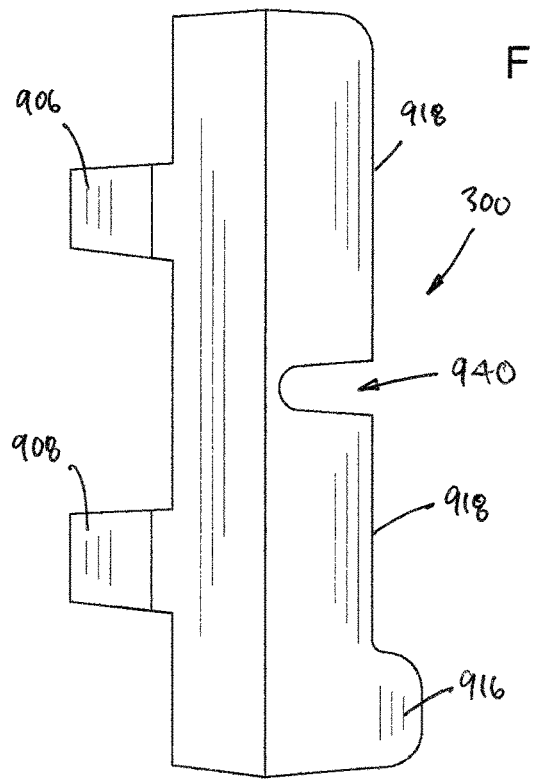
FIG. 10B shows a side view of the suspension buffer of FIG. 10A.
Figure 10C:
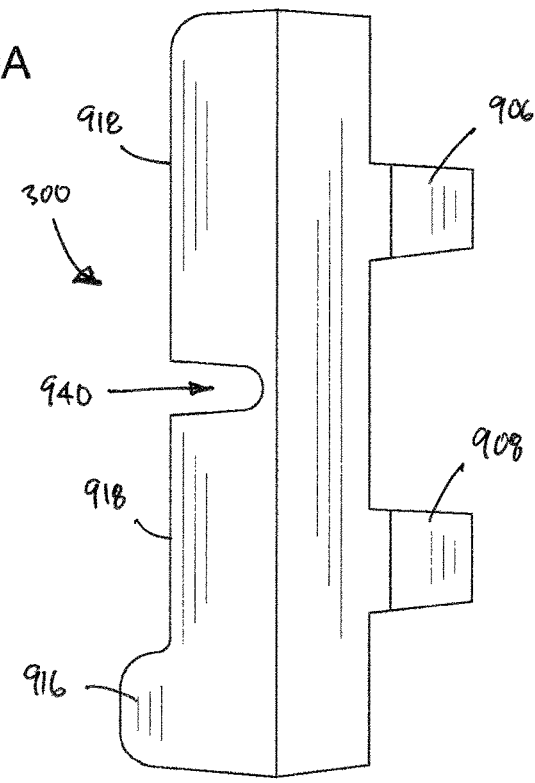
FIG. 10C shows an opposing side view of the suspension buffer of FIG. 10A.
Figure 10D:
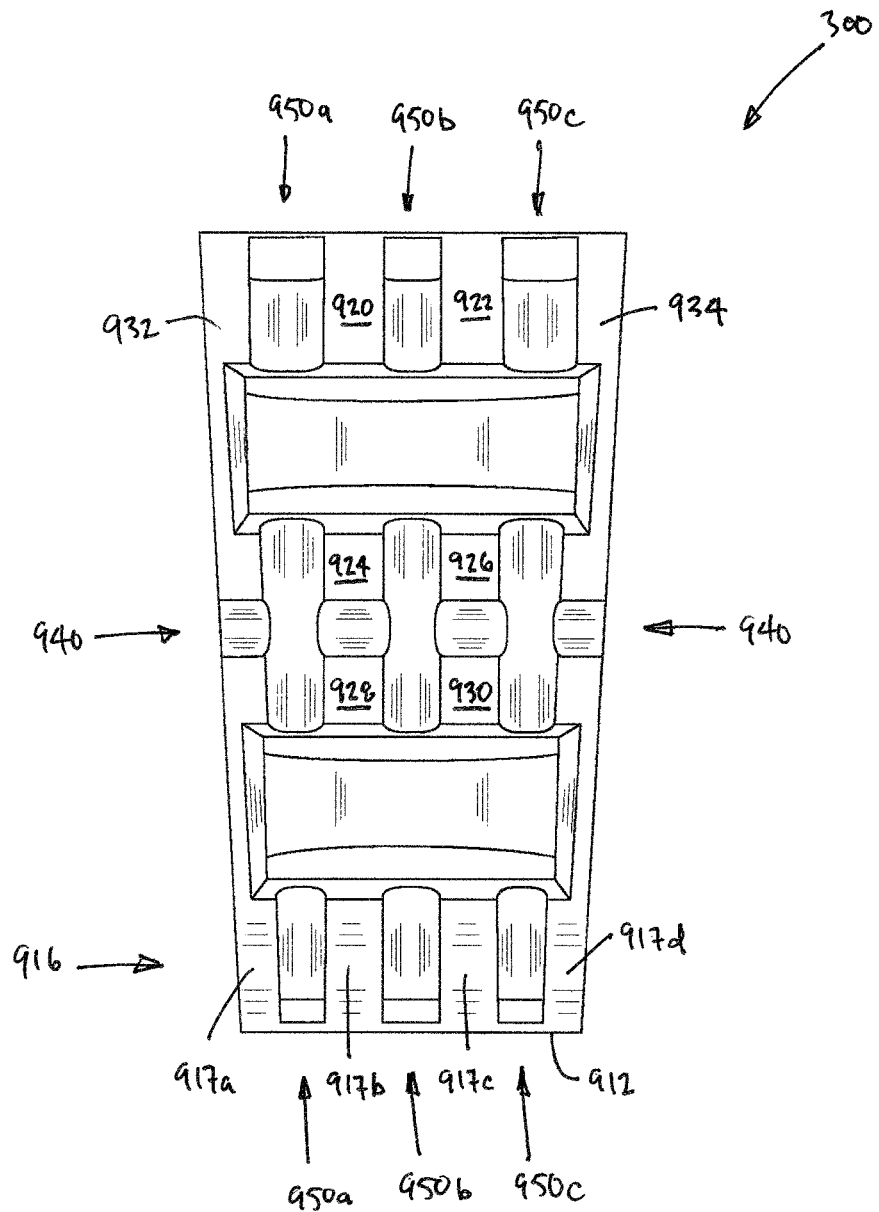
FIG. 10D shows a back view of the suspension buffer of FIG. 10A.
Figure 10E:
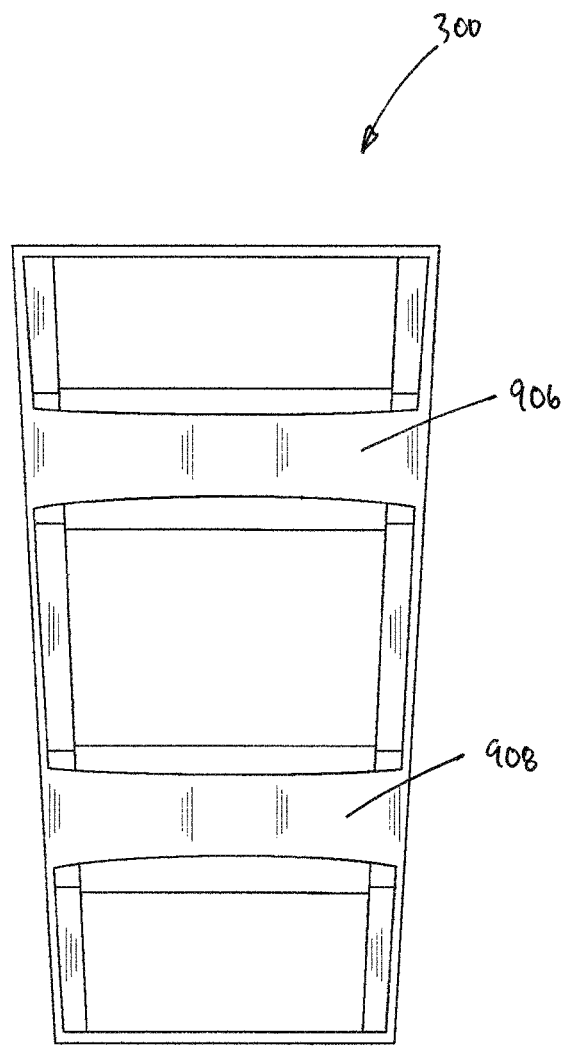
FIG. 10E shows a front view of the suspension buffer of FIG. 10A.
Figure 10F:
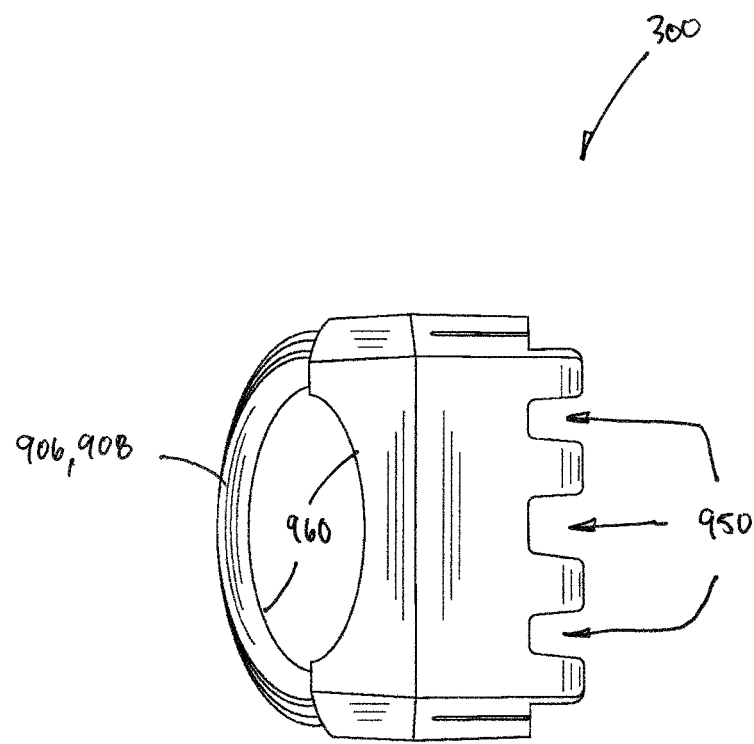
FIG. 10F shows a bottom view of the suspension buffer of FIG. 10A.
Figure 10G:
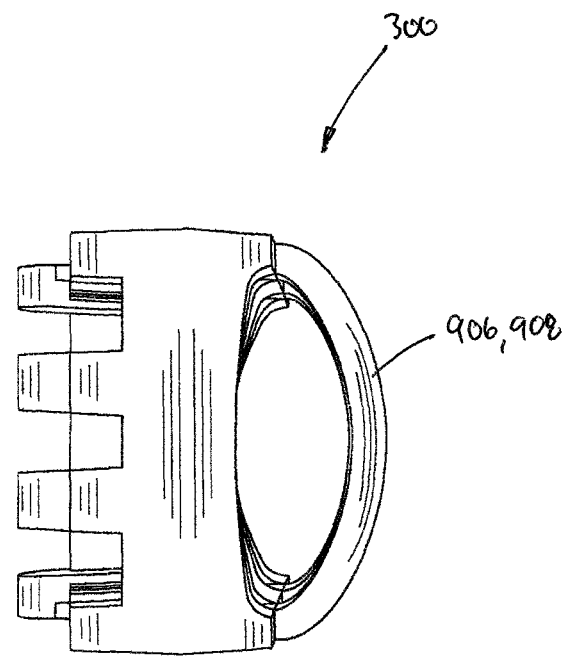
FIG. 10G shows a top view of the suspension buffer of FIG. 10A.
Figure 10H:
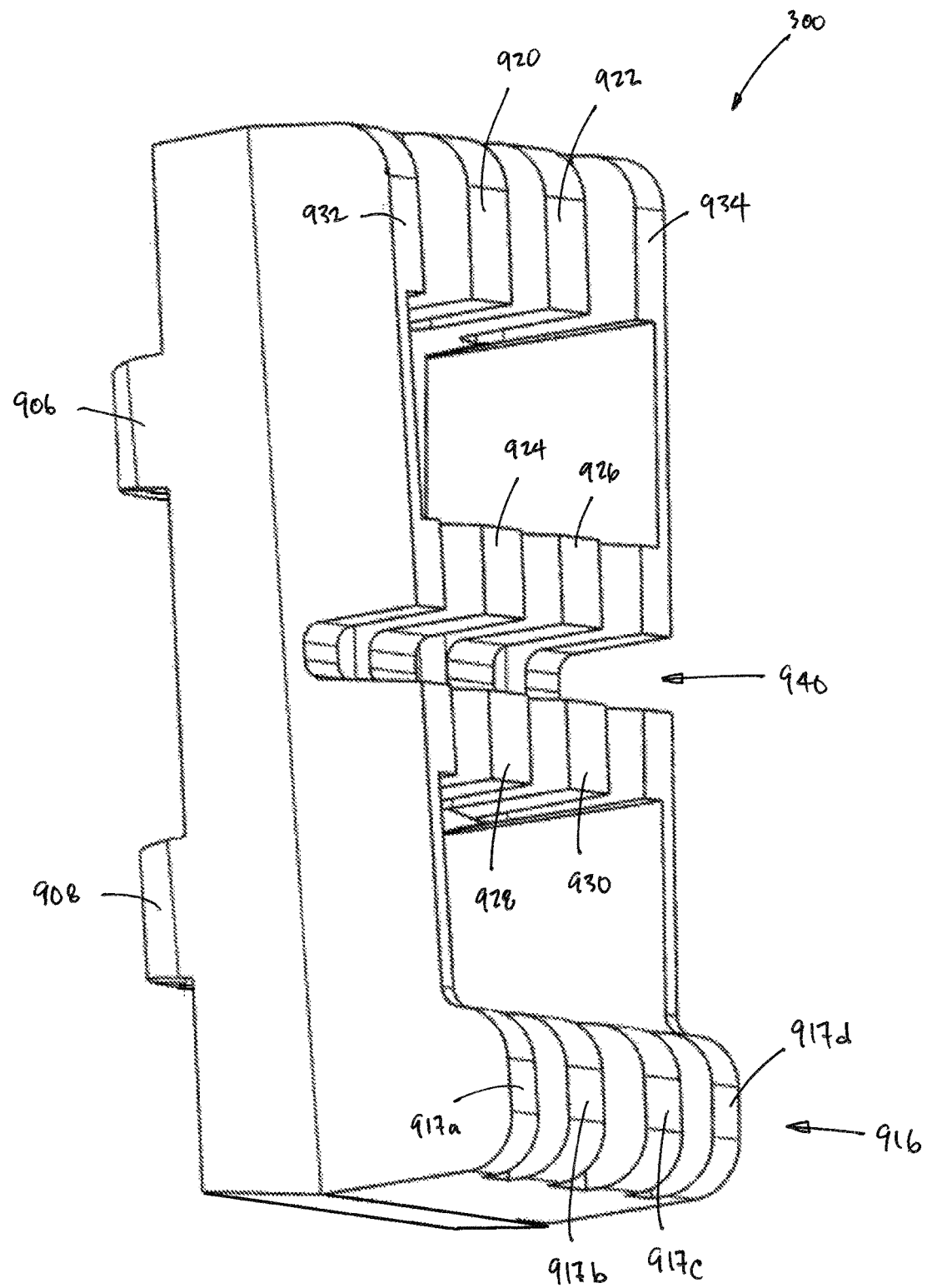
FIG. 10H shows a perspective view of the suspension buffer of FIG. 10A.
Figure 11B:
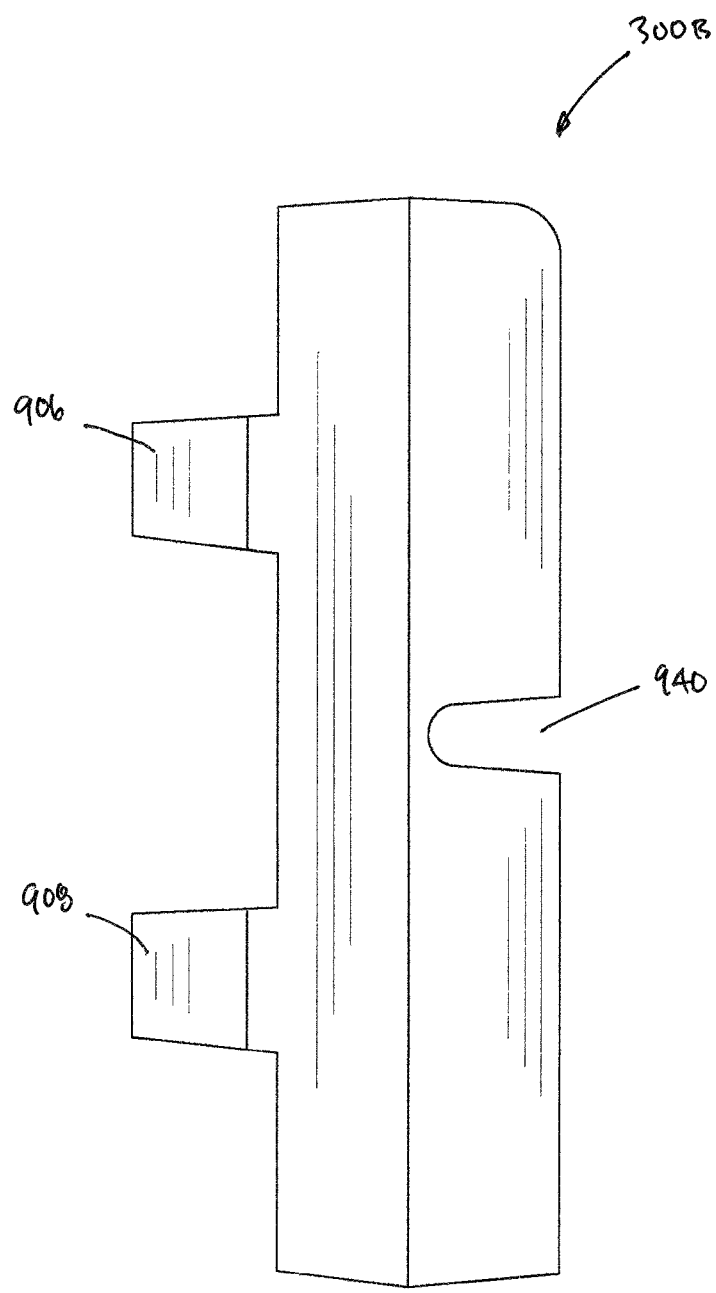
FIG. 11B shows a side view of the suspension buffer of FIG. 10A.
Figure 11C:
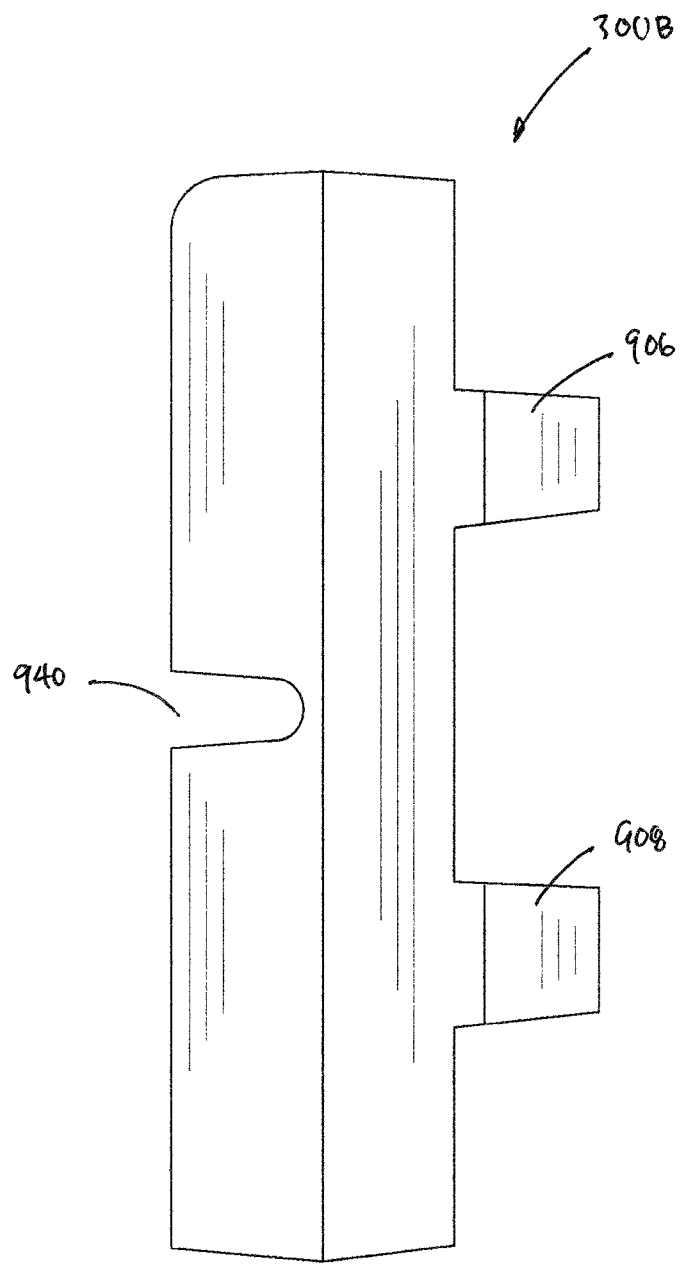
FIG. 11C shows an opposing side view of the suspension buffer of FIG. 10A.
Figure 11D:
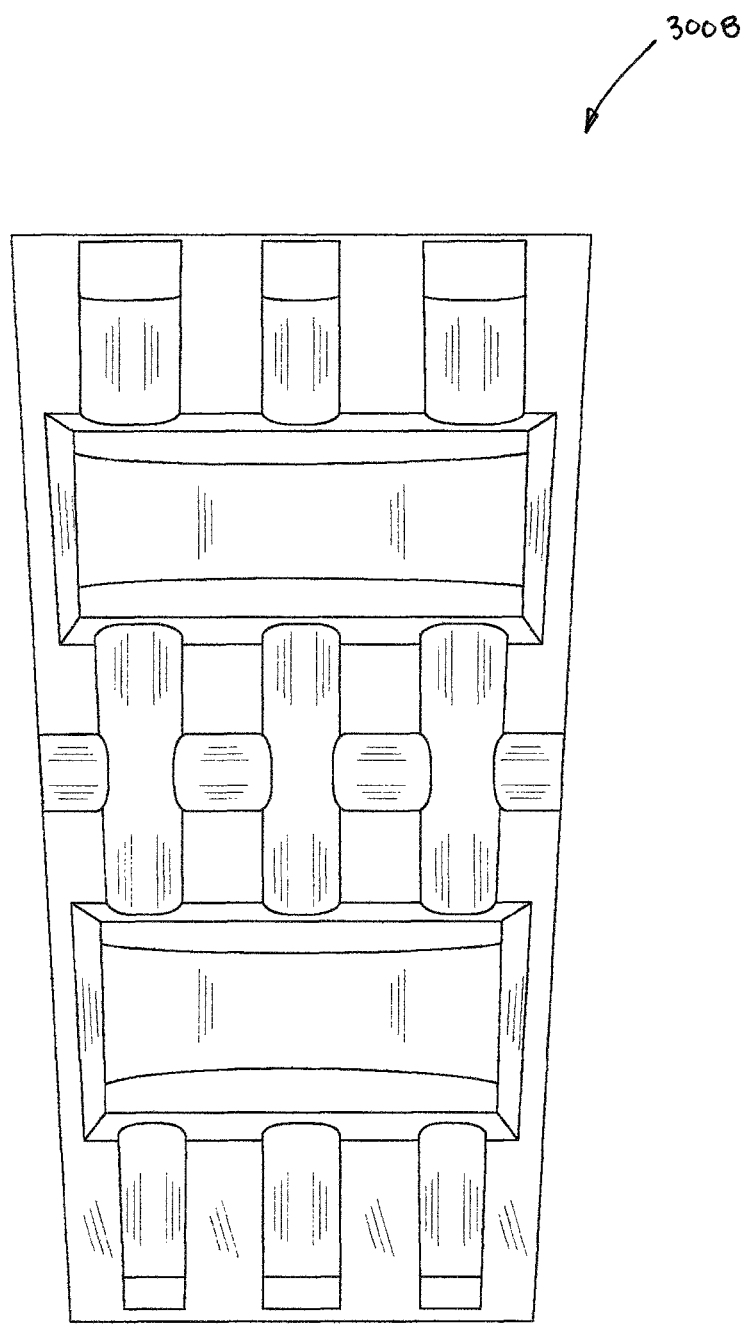
FIG. 11D shows a back view of the suspension buffer of FIG. 10A.
Figure 11E:
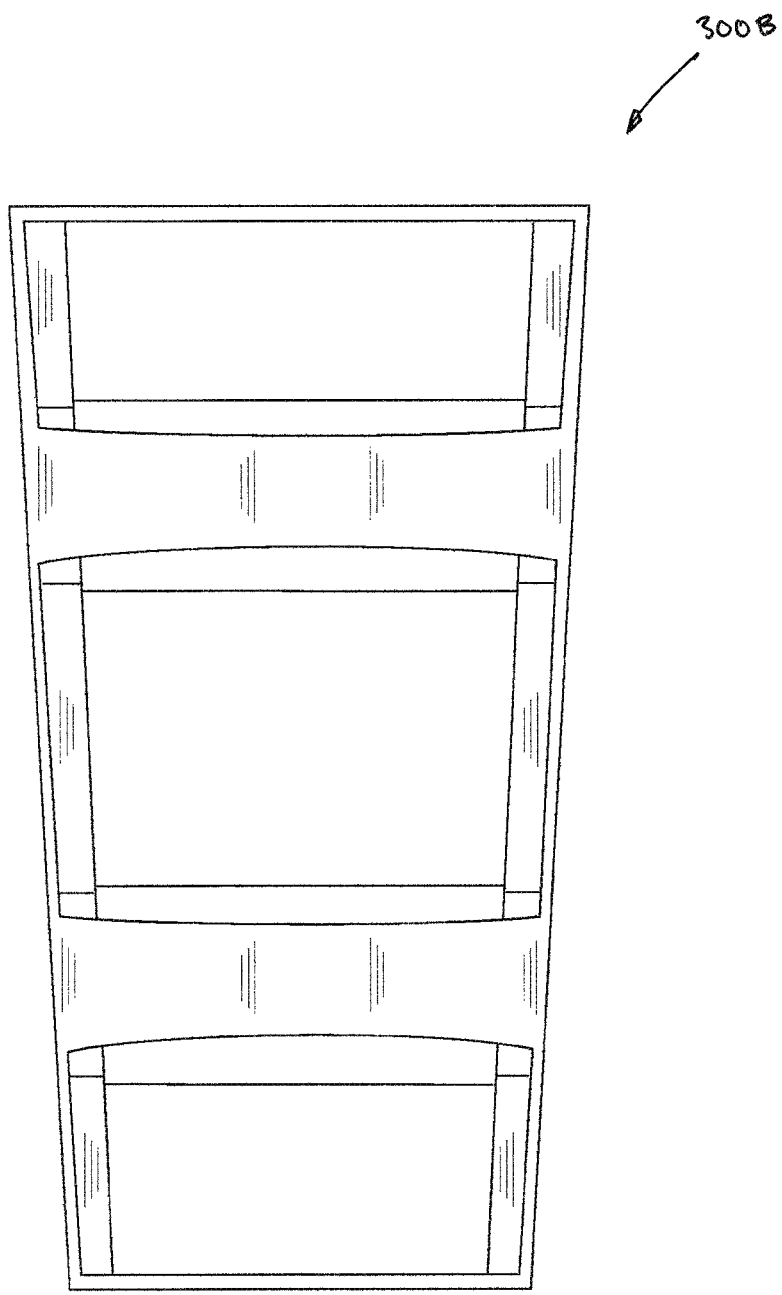
FIG. 11E shows a front view of the suspension buffer of FIG. 10A.
Figure 11F:
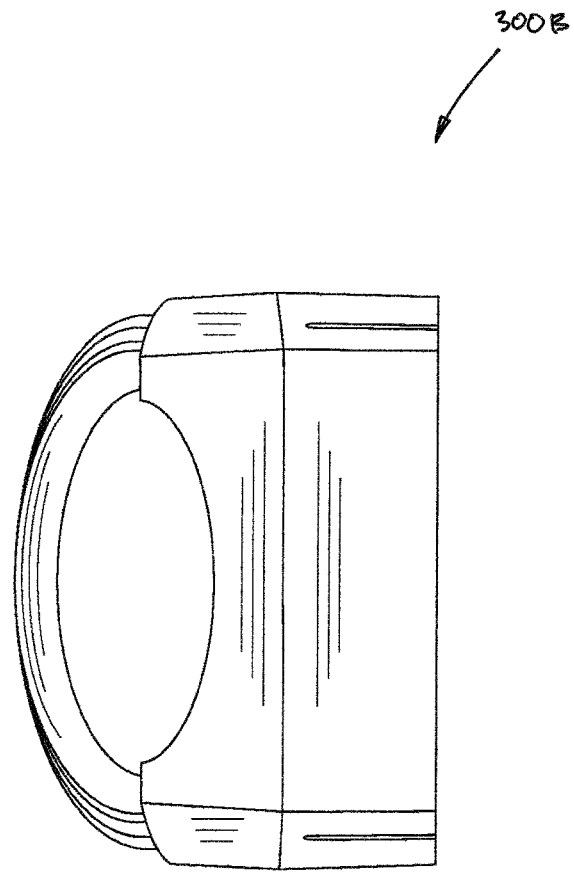
FIG. 11F shows a bottom view of the suspension buffer of FIG. 10A.
Figure 11G:
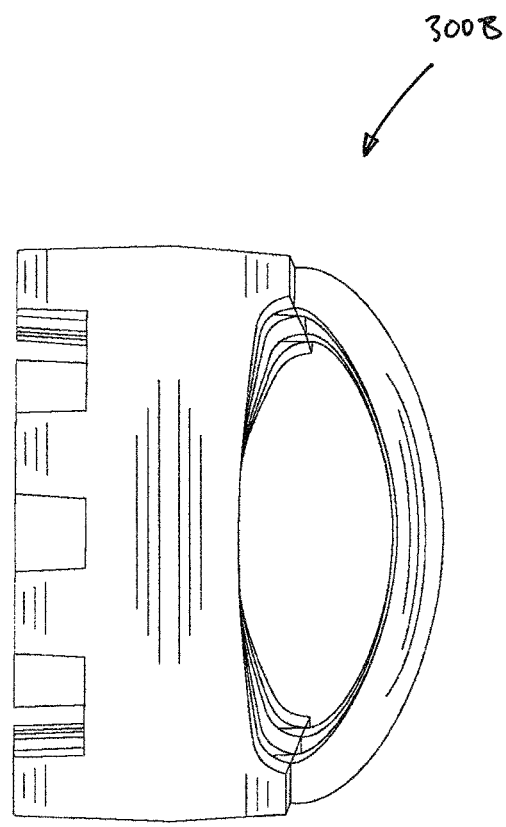
FIG. 11G shows a top view of the suspension buffer of FIG. 10A.
Figure 11H:
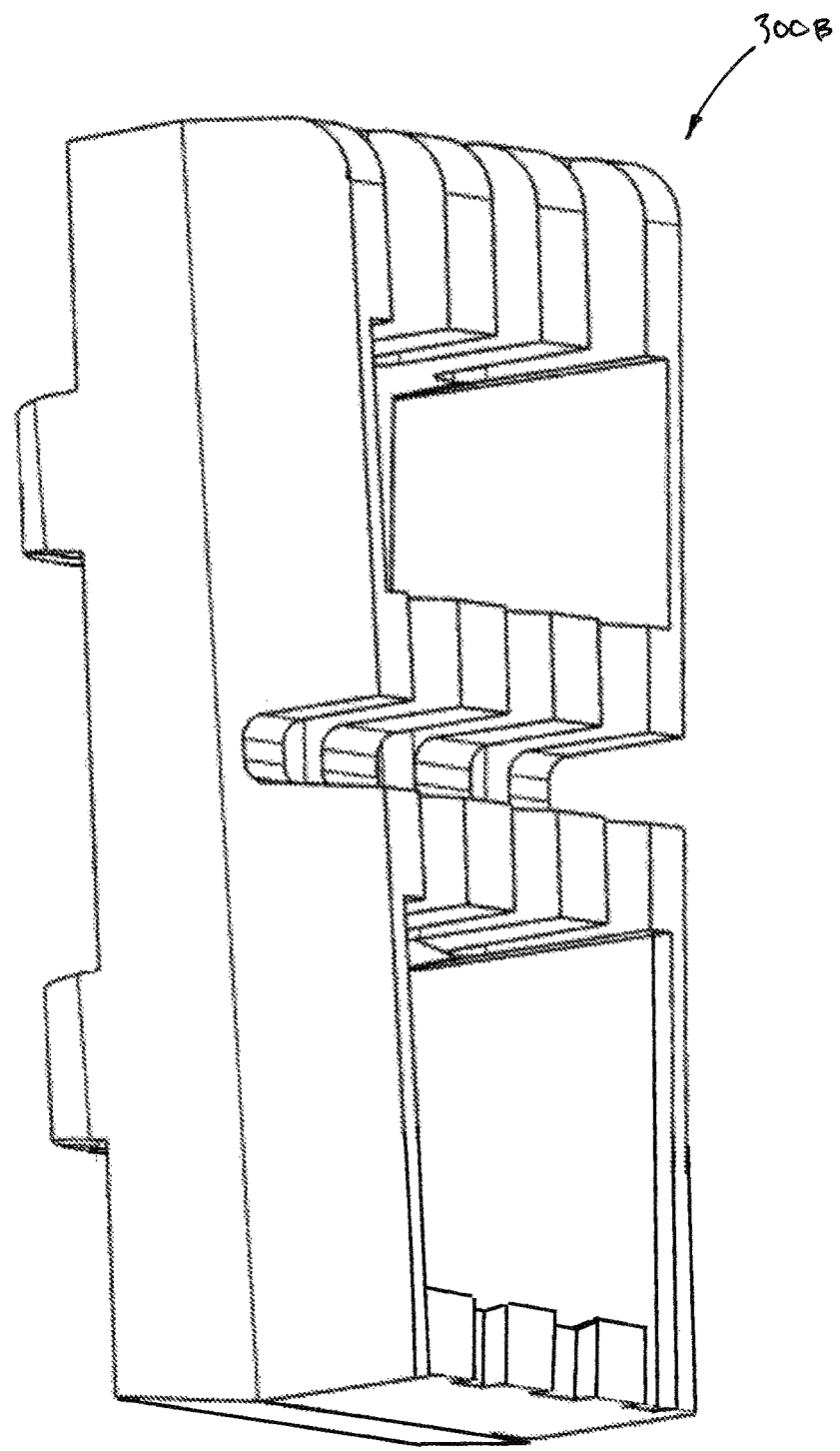
FIG. 11H shows a perspective view of the suspension buffer of FIG. 10A.
Figure 12A:
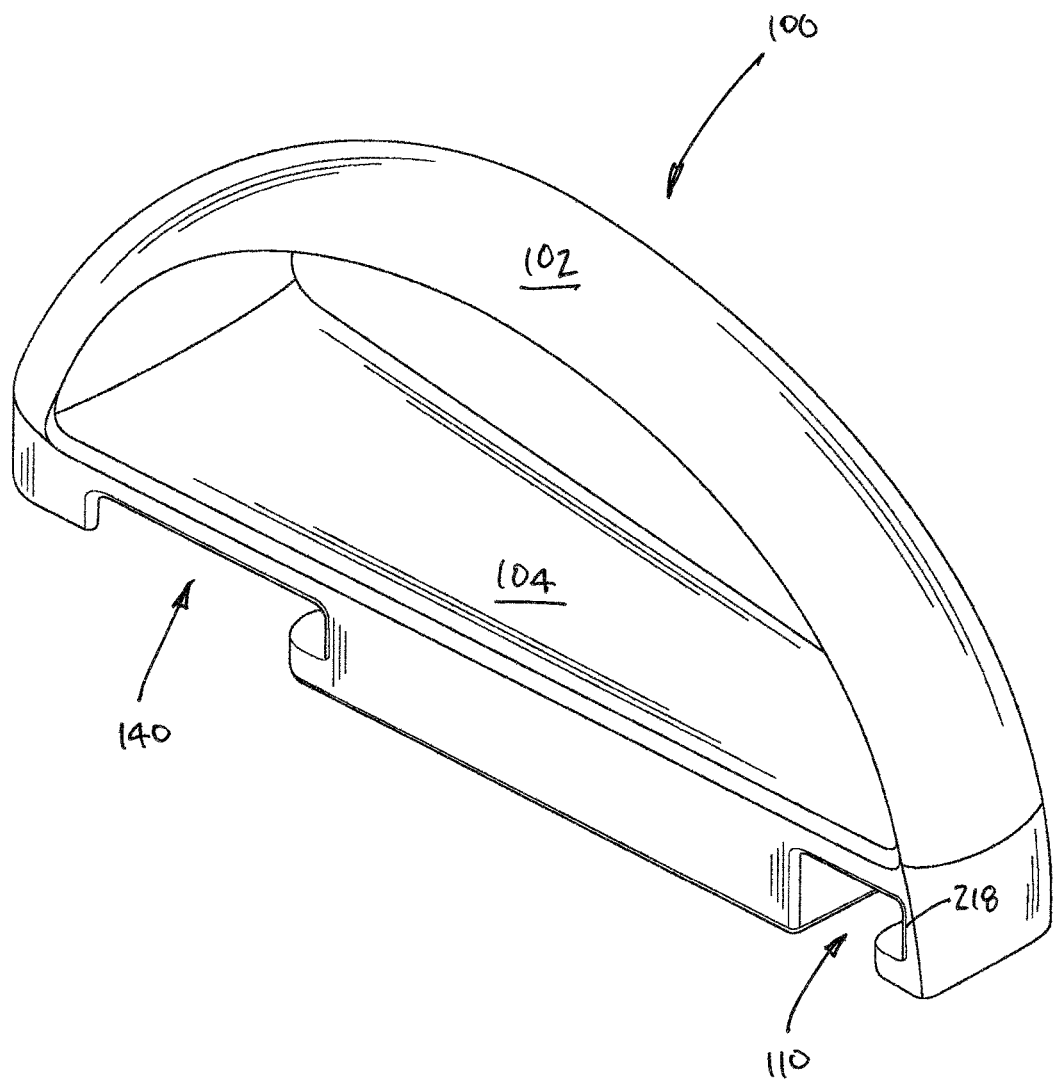
FIG. 12A shows a perspective view of a twist handle.
Figure 12B:
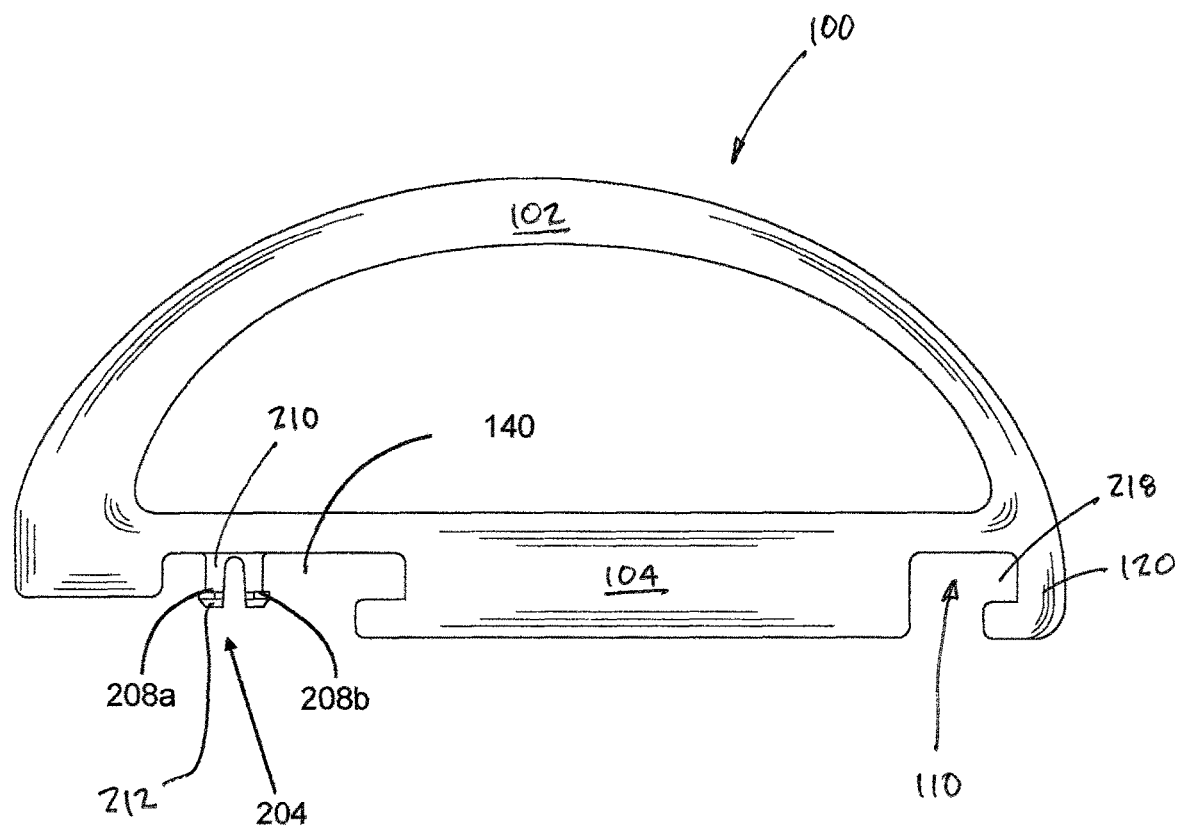
FIG. 12B shows a side view of a twist handle.
Figure 12C:
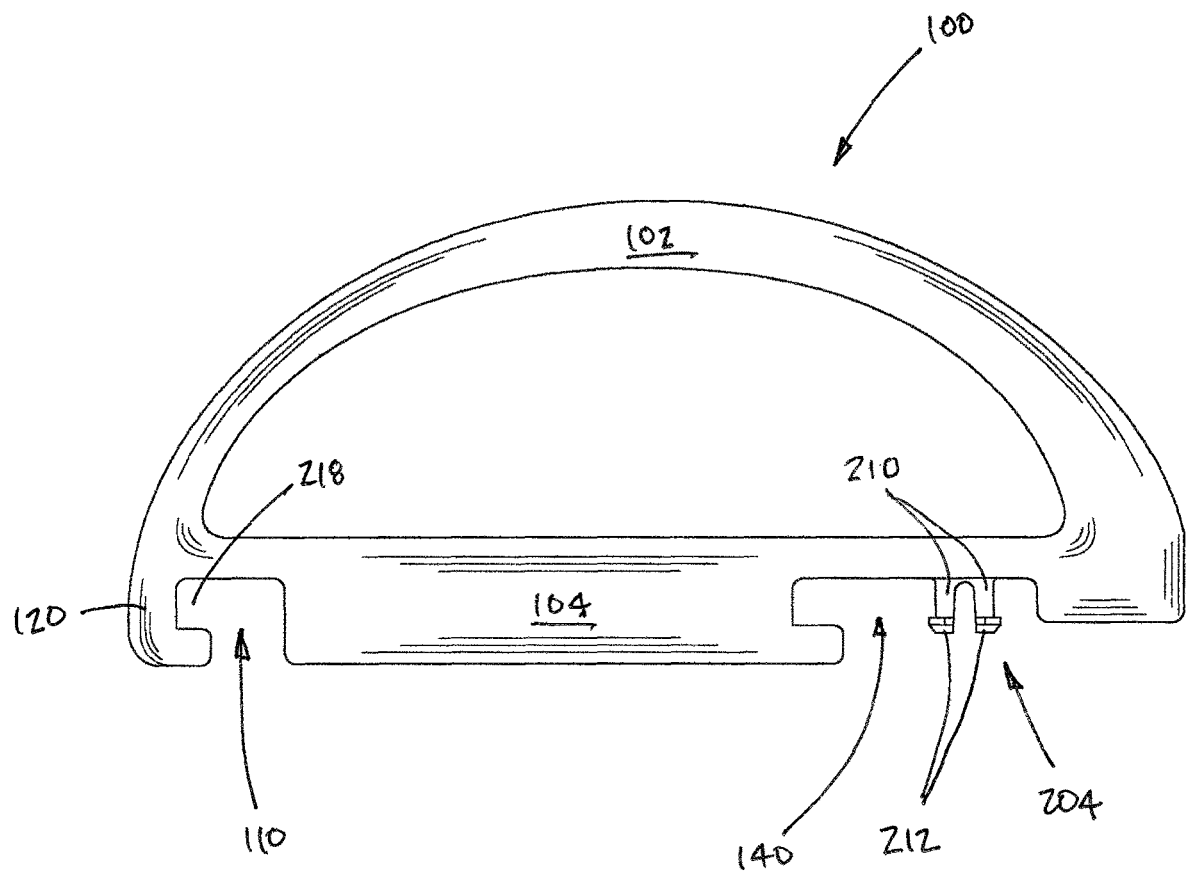
FIG. 12C shows an opposing side view of a twist handle.
Figure 12D:
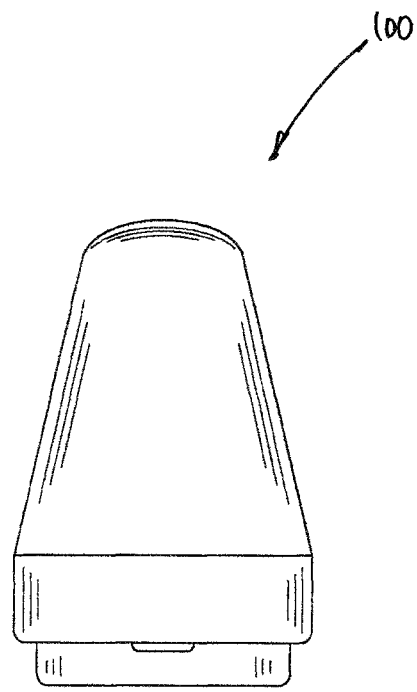
FIG. 12D shows a front view of a twist handle.
Figure 12E:
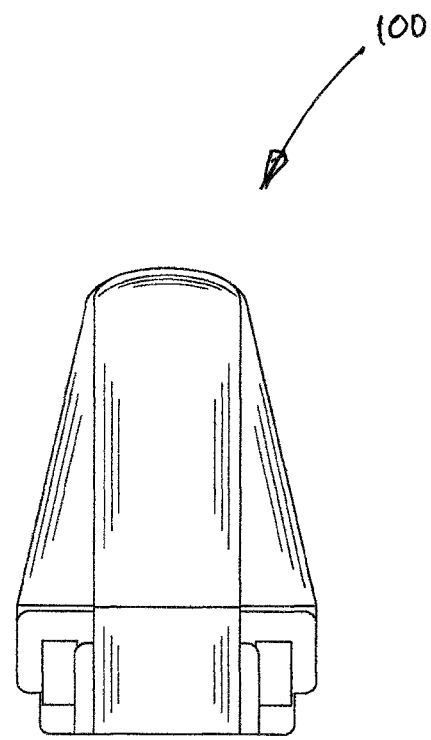
FIG. 12E shows a front view of a twist handle.
Figure 12F:
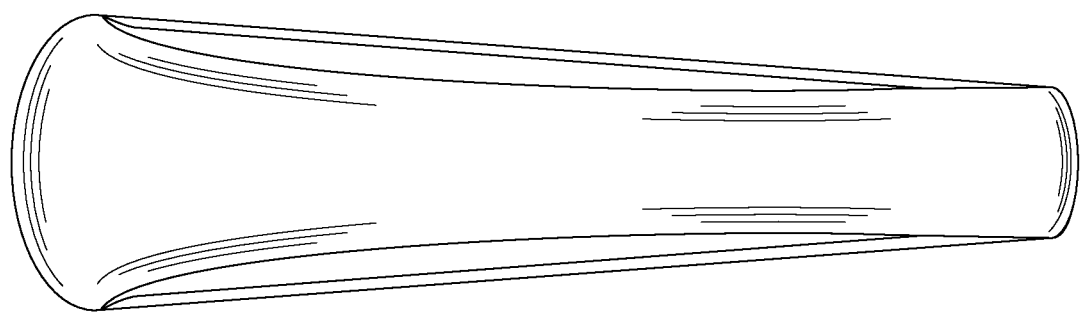
FIG. 12F shows a front view of a twist handle.
Figure 12G:
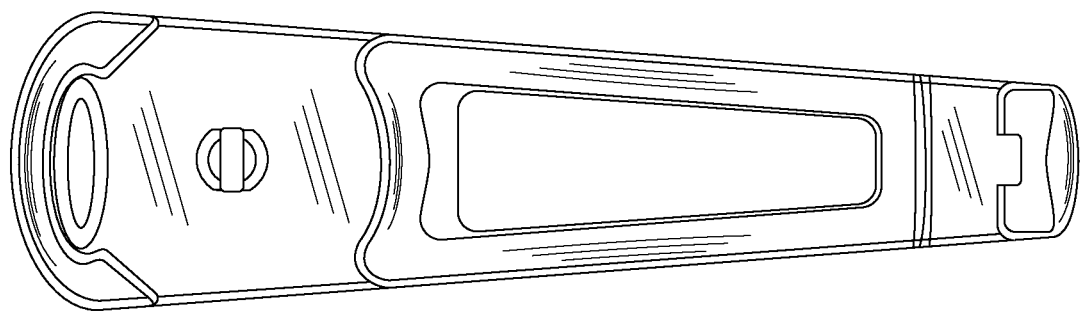
FIG. 12G shows a bottom view of a twist handle.
Figure 13:
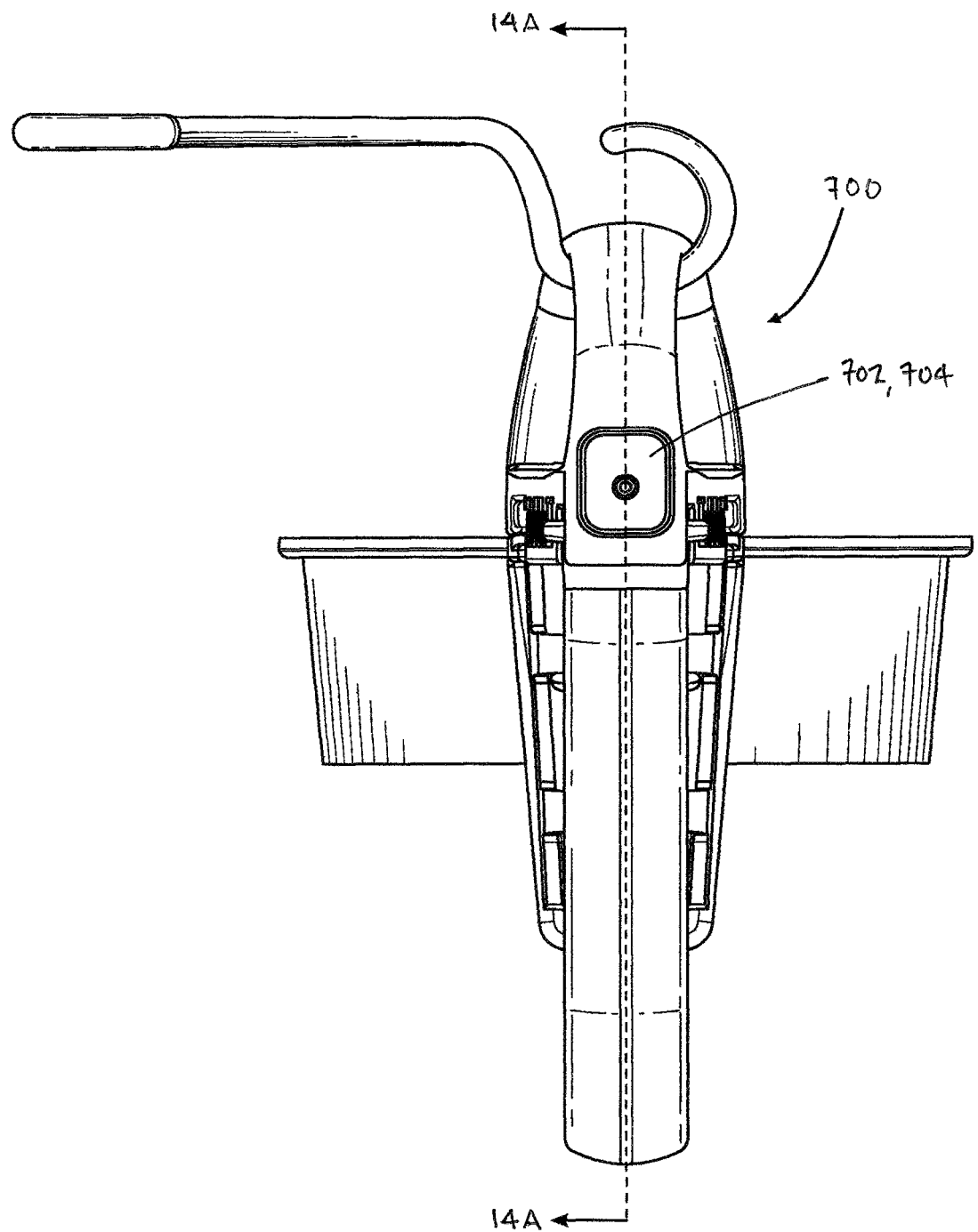
FIG. 13 shows a back view of a rotatable hook assembly.
Figure 14A:
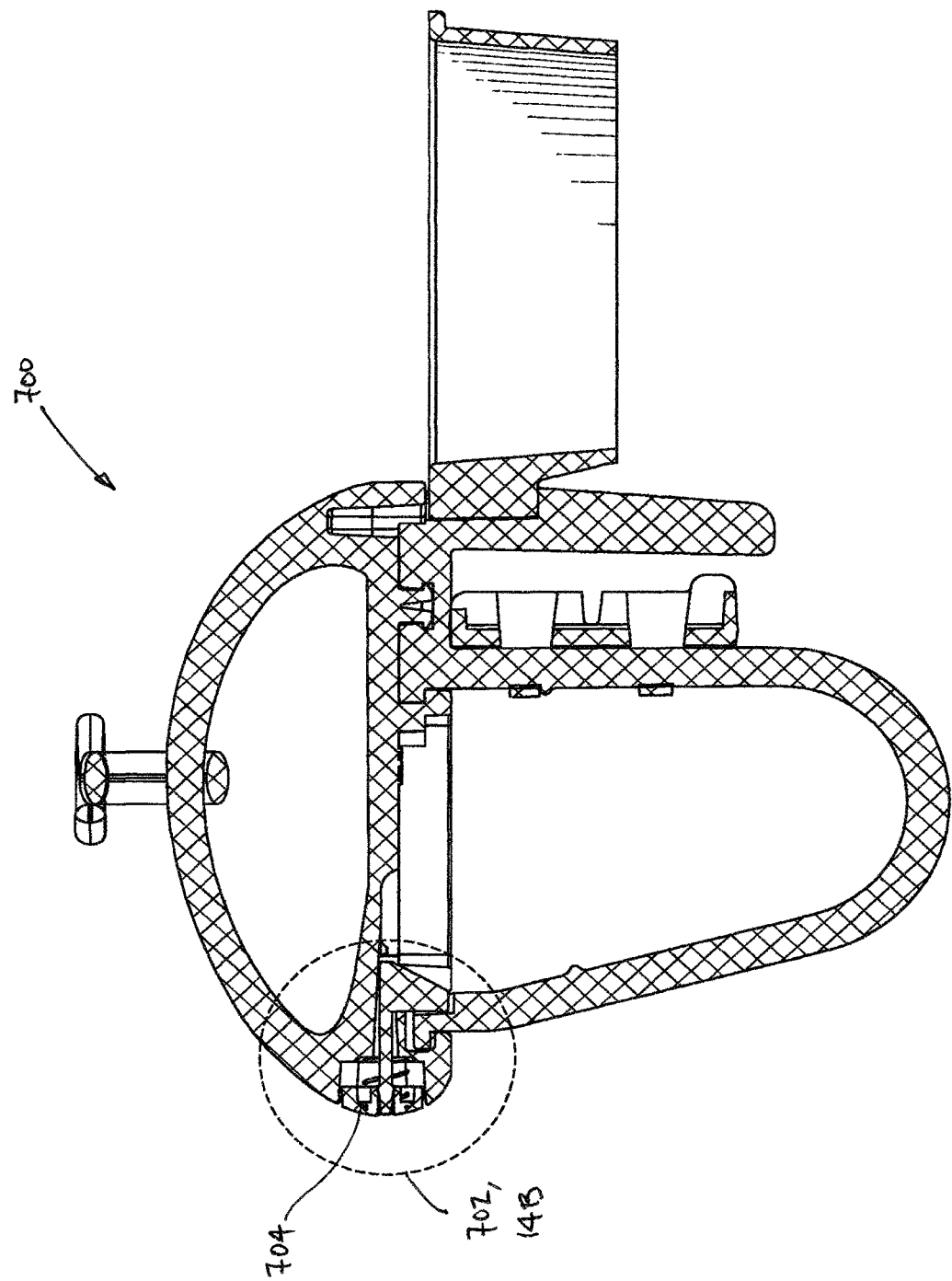
FIG. 14A shows a cross-sectional view of the rotatable hook assembly of FIG. 13, the cross section cut is shown at the dotted line drawn in FIG. 13, the arrow shows the direction of the cross section view.
Figure 14B:
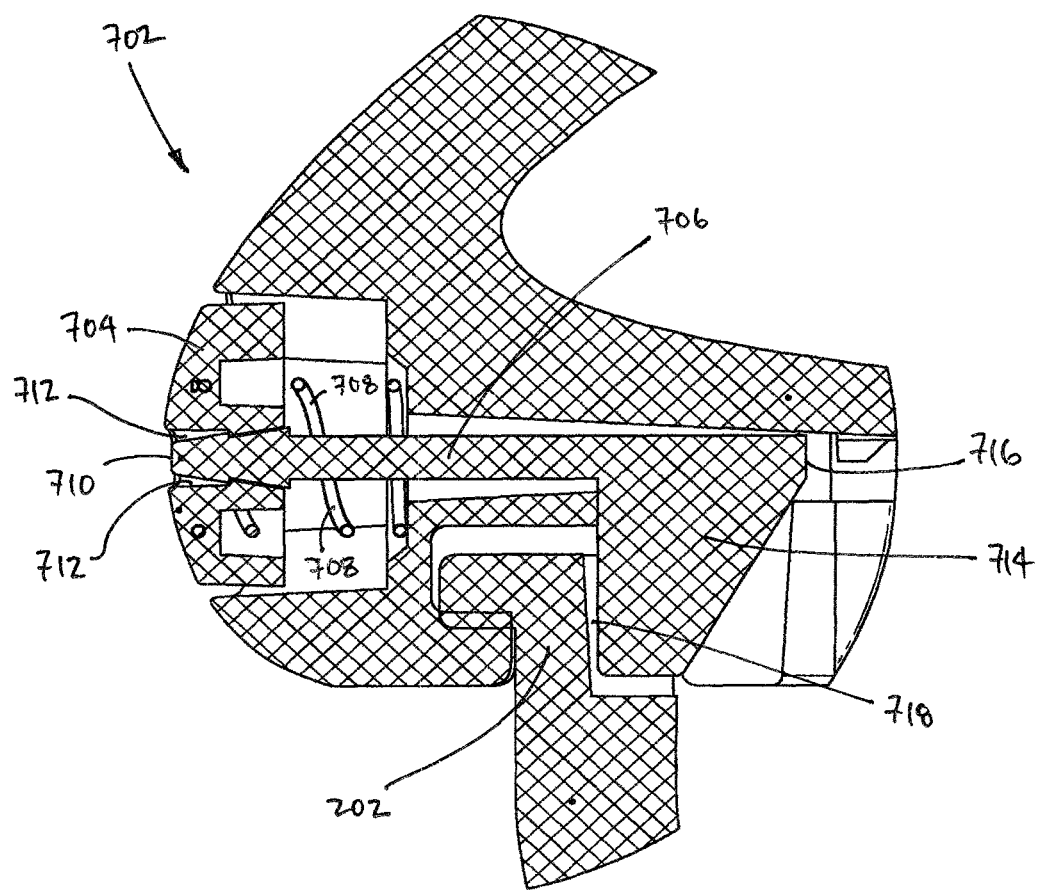
FIG. 14B shows an enlarged view of the portion of FIG. 14A which is encircled by a dotted line.
Figure 15:
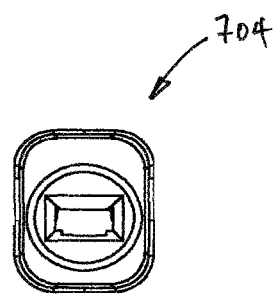
FIG. 15 shows a back view of a button shell.
Figure 16:
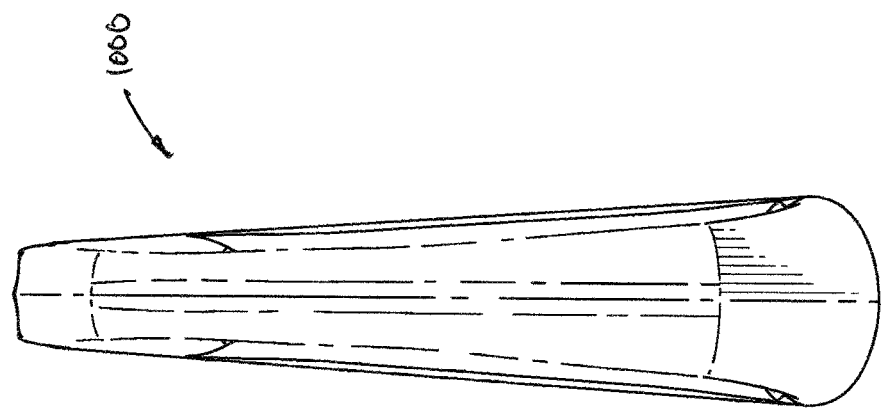
FIG. 16 shows a top view of the twist handle shown in FIG. 13.
Figure 17:
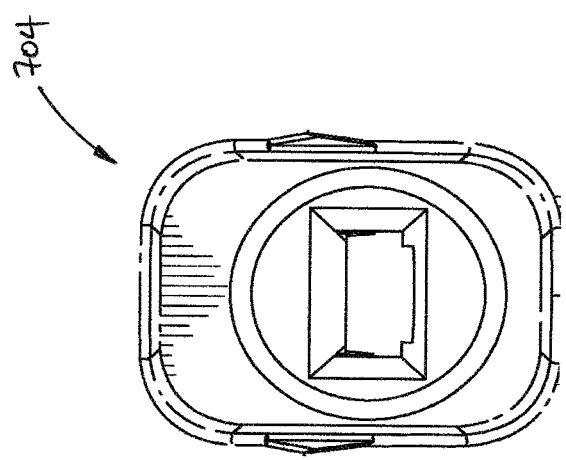
FIG. 17 shows an enlarged view of a button from the back view.

Referring to FIG. 10D, the embodiment of a suspension buffer 300 has a first end piece 920, a second end piece 922, a first central end piece 924, a second central end piece 926, a third central end piece 928, a fourth central end piece 930, a first side piece 932, and a second side piece 934. As shown in FIG. 10D, a first vertical channel 950*a* for engaging a substantially vertical bar of a shopping cart 350 (see FIGS. 2 and 3) may be defined by 920, 924, 928, 917*b*, 917*a*, and 933.

In the preferred embodiments a second vertical channel 950*b* for engaging a substantially vertical bar of a shopping cart 350 may be defined by 922, 926, 930, 917*c*, 917*b*, 928, 924 and 920 Preferred embodiments the width of the second vertical channel may be between 0.1 mm and 5 mm in width or may be between 0.1 mm and 1 mm, 1 mm and 2 mm, 2 mm and 3 mm, or 1.5 mm and 2 mm in width. In some embodiments the lengths of the vertical channels 950*a*, 950*b* and 950*c* may be between 35 mm and 70 mm, 40 mm and 50 mm, 51 mm and 57 mm, 53 mm and 65 mm.

In the preferred embodiments a third vertical channel 950*c* for engaging a substantially vertical bar of a shopping cart 350 may be defined by 934, 917*d*, 917*c*, 930, 926 and 922.

In the preferred embodiments, a substantially horizontal channel 940 may be defined by 932, 924, 926, 934, 917*d*, 930, 928, and 917*a* and may be between 0.1 mm and 70 mm, 5 mm and 20 mm, 10 mm and 20 mm, 25 mm and 35 mm, 31 mm and 38 mm in length. The depth of the horizontal channel 940 may be between 2 mm and 15 mm, 8 mm and 12 mm, or 9 mm and 11 mm. The width of the horizontal channel 940 may be between 2 mm and 15 mm, 4 mm and 7 mm, 5 mm and 8 mm, 5 mm and 7 mm, and the upper width of the horizontal channel may be greater than the lower width of the horizontal channel such that the upper width minus the lower width may range between 0.01 mm and 10 mm, 1 mm and 2 mm, 1 mm and 4 mm, 0.5 mm and 1.5 mm.

The above specification, examples and data provide a description of the structure and use of exemplary implementations of the described systems, articles of manufacture and methods. It is important to note that many implementations can be made without departing from the spirit and scope of the invention.

In FIGS. 13 to 21F, an alternative embodiment of a rotatable hook assembly 700 is illustrated. The primary distinction over the embodiment of a rotatable hook assembly 10 is the introduction of a push-button mechanism 702 configured to replace the entrapment tooth 216 and slot 218 of rotatable hook assembly 10. The push-button mechanism 702 may include a lock button 704 shown with a shaft 706. The shaft 706 fits within the twist 1000 or grasp 102 handle adjacent to entrapment bay 110. As best shown in the cross-sectional view of the push-button locking mechanism 702 of FIG. 14B, the shaft 706 may be placed through a spring 708. The proximal end 710 of the shaft 706 may protrude through a central void 712 of the lock button 704. The shaft 706 may have an end piece 714 located at a distal end 716 of the shaft 706 which acts as a wedge. In operation, the proximal end 710 of the shaft 706, when pushed by a user finger or thumb at lock button 704, applies force against the proximal end 710 of the shaft 706 then the entire shaft 706 moves toward the distal end 716, thereby pushing the end piece 714 out from within a channel 2218 formed in locking portion 2202 of bag hook 2000 (see FIGS. 19A-19O), thereby allowing locking portion 2202 to be rotated out of entrapment bay 110. In some embodiments, the twist handle has a two pronged component that may be rotationally attached to the bag handle allowing the bag handle to be rotated clockwise or counterclockwise.

Figure 18A:
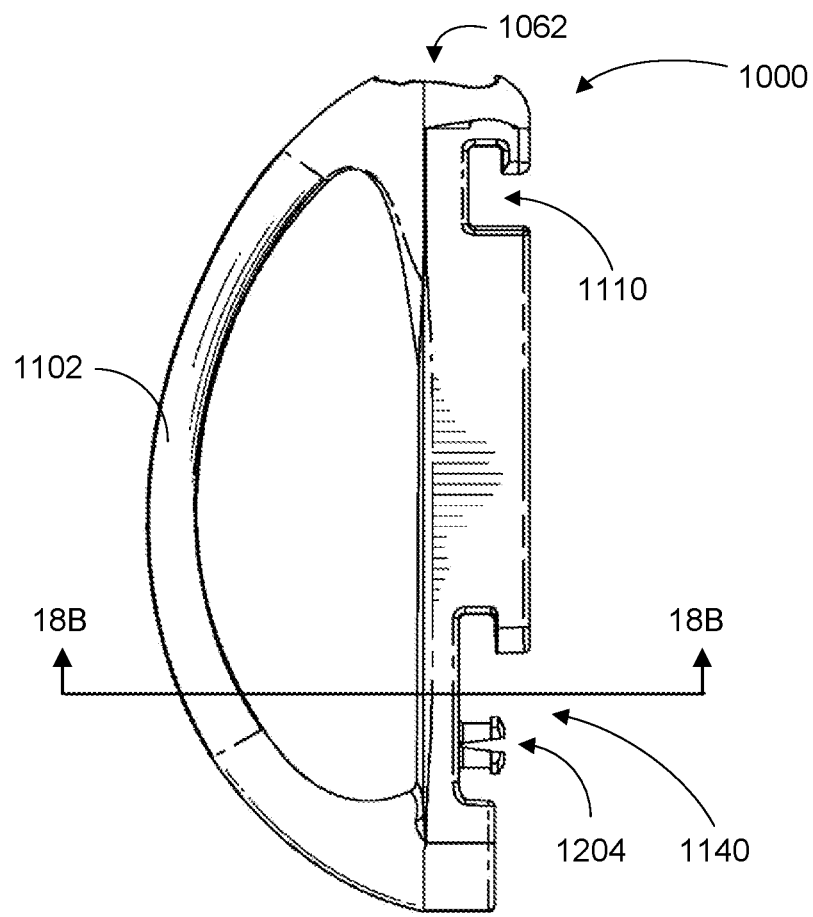
FIG. 18A shows a right-side view of an embodiment of a twist handle, according to the present invention.
Figure 18B:
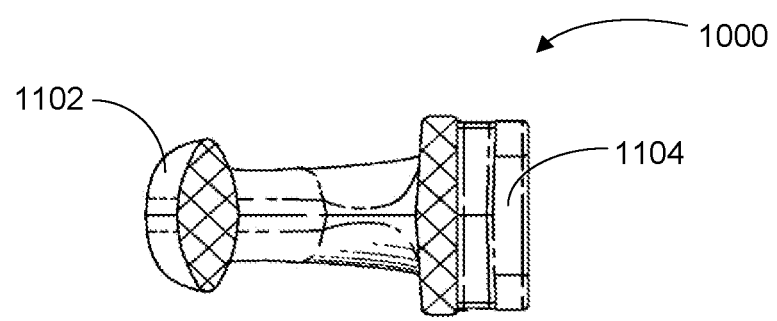
FIG. 18B shows a cross sectional view of the twist handle shown in FIG. 18A, the cross sectional cut as indicated in FIG. 18A, with the arrows showing the direction of the cross section view.
Figure 18C:
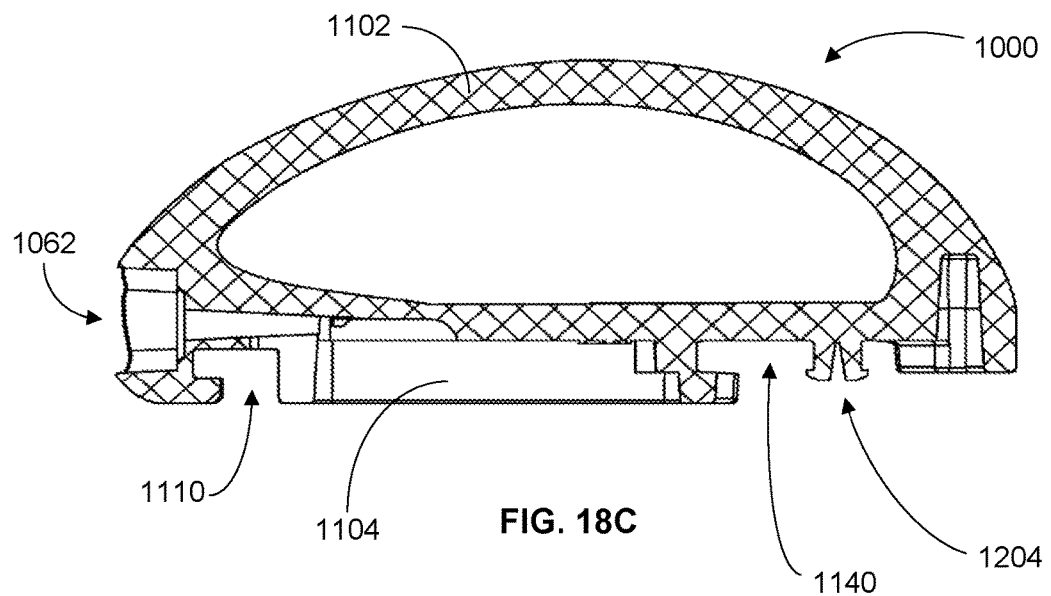
FIG. 18C shows a cross sectional view indicated in FIG. 18D of the twist handle of FIGS. 18A and 18B, the twist handle of FIG. 18C defines an opening for half of the button shell of FIG. 15, see the description of FIG. 18D for information about the cross sectional view.
Figure 18D:
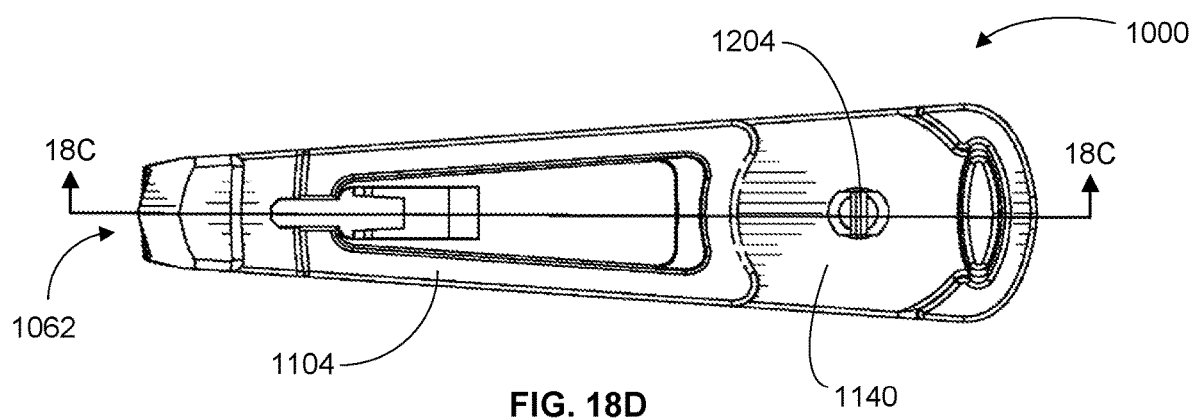
FIG. 18D shows a bottom view of the twist handle of FIGS. 18A-18C and indicates the cross section view of FIG. 18C with arrows showing the direction of the view.
Figure 18E:
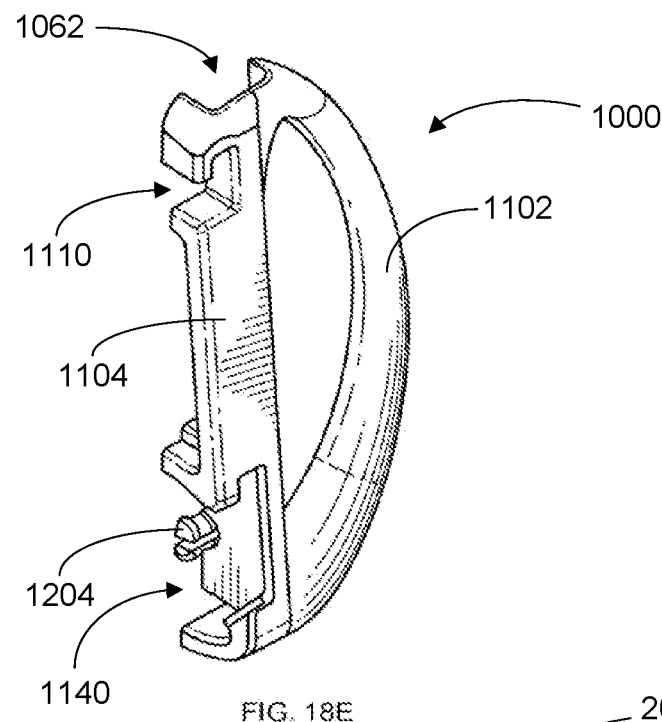
FIG. 18E shows a perspective view of the twist handle section of FIG. 18C.

FIGS. 18A-18E illustrate various views of an embodiment of a twist handle 1000 according to the present invention. More particularly, FIG. 18A illustrates a right-side view of an embodiment of a twist handle 1000, according to the present invention. FIG. 18B illustrates a cross sectional view of the twist handle 1000 shown in FIG. 18A, the cross sectional cut as indicated in FIG. 18A, with the arrows showing the direction of the cross section view. FIG. 18C illustrates the cross sectional view indicated in FIG. 18D of the twist handle shown in FIGS. 18A and 18B. The twist handle of FIG. 18C defines an opening for half of the button shell of FIG. 15. FIG. 18D illustrates a bottom view of the twist handle shown in FIGS. 18A-18C. FIG. 18D further indicates the cross section view of FIG. 18C with arrows showing the direction of the view. FIG. 18E shows a perspective view of the twist handle section of FIG. 18C. More particularly, FIGS. 18A-18E illustrate grasp handle 1102, linear base member 1104, opening 1062 for receiving a lock button (not shown, but see, 704, FIG. 14B), entrapment bay 1110, rotation bay 1140 and rotatable member 1204.

Figure 22:
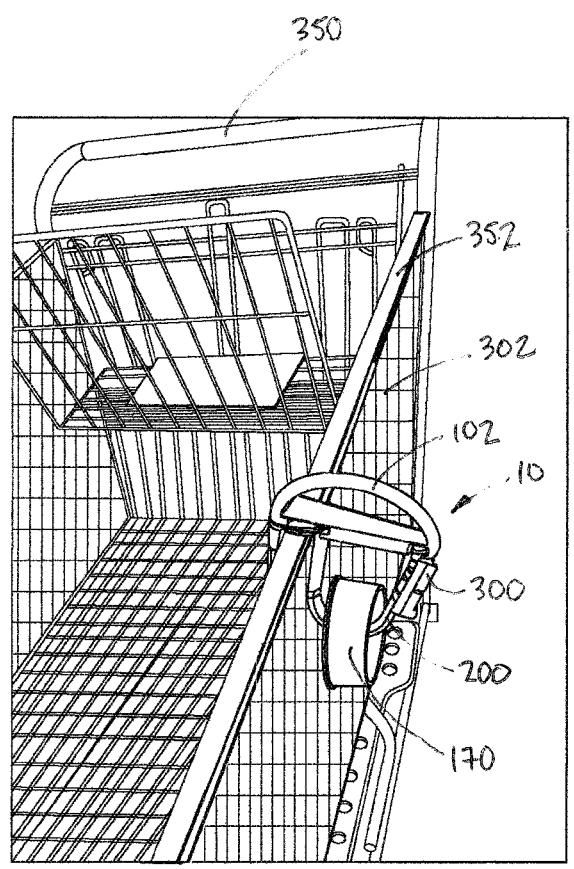
FIG. 22 shows a perspective view of a rotatable hook assembly attached to a bar of a shopping cart wherein the bar is larger and thus the suspension buffer is positioned on the opposite end of the bag hook.

FIG. 22 shows a perspective view of a rotatable hook assembly 10 attached to a bar 352 of a shopping cart 350 wherein the bar 352 on the cart wall 302 is larger than in the cart 350 shown in FIG. 2. As shown in FIG. 22 the suspension buffer 300 is positioned on the opposite end of the bag hook 200 from that shown in FIG. 2. FIG. 22 further illustrates grasp handle 102, bag hook 200, suspension buffer 300, shopping cart wall 302 and cup holder 170.

What is claimed:

1. A rotatable hook assembly for carrying objects with looped handles, the rotatable hook assembly, comprising:
   a twist handle, comprising:
      a linear base member including a lock flange partially surrounding an entrapment bay at a first end and a rotatable member within a rotation bay disposed at a second end;
      an arcuate grasp handle connected to the first and second ends of the linear base member;
      an opening for receiving fingers disposed between the base member and the grasp handle; and
   a bag hook, comprising:
      a locking portion;
      a vertically oriented first cart member;
      a vertically oriented second cart member disposed parallel to the first cart member;
      a rotatable member receiver connected between the first and the second cart members;
      an arcuate bag storage loop extending from the locking portion and into the second cart member; and
   wherein the rotatable member receiver of the bag hook is rotatably coupled to the rotatable member with the rotation bay of the twist handle.

2. The rotatable hook assembly according to claim 1, wherein the locking portion of the bag hook may be releasably locked within the entrapment bay of the twist handle to form an aperture for securely receiving the looped handles.

3. The rotatable hook assembly according to claim 1, wherein the locking portion further includes an entrapment tooth and the lock flange further includes a slot for receiving the entrapment tooth when the bag hook is locked to the twist handle.

4. The rotatable hook assembly according to claim 1, wherein the first cart member further comprises a substantially flat portion opposite the second cart member.

5. The rotatable hook assembly according to claim 4, wherein the first cart member further comprises an accessory mount receiver opposite the substantially flat portion.

6. The rotatable hook assembly according to claim 5, further comprising an accessory mounted within the accessory mount receiver.

7. The rotatable hook assembly according to claim 6, wherein the accessory comprises an annular cup holder.

8. The rotatable hook assembly according to claim 1, further comprising a headrest storage hook configured for suspending the rotatable hook assembly from an upright support member of a car seat headrest.

9. The rotatable hook assembly according to claim 1, further comprising a suspension thickness buffer configured for placement around the second cart member and between the first and the second cart members.

10. The rotatable hook assembly according to claim 9, wherein the suspension thickness buffer further comprises at least one back band member configured for placement around the second cart member.

11. The rotatable hook assembly according to claim 10, wherein the second cart member further comprises at least one back band member ridge configured for resting against and supporting the at least one back band member of the suspension thickness buffer.

12. The rotatable hook assembly according to claim 1, wherein the first and the second cart members are configured to surround and be supported by a shopping cart wall or sidewall.

13. The rotatable hook assembly according to claim 1, wherein the base member further comprises a push-button mechanism disposed within the lock flange for unlocking and releasing the locking portion from within the entrapment bay.

14. The rotatable hook assembly according to claim 13, wherein the push-button mechanism further comprises:
   a lock button having a central void;
   a shaft having a proximal end and a distal end, the proximal end configured for mating with the central void of the lock button, the distal end extending from the lock button and ending in an end piece;
   a coil spring wrapped around the shaft and configured with a first end disposed within the lock button and the second end adjacent to the lock flange; and
   wherein the coil spring biases the end piece against the locking portion.

15. The rotatable hook assembly according to claim 14, wherein the proximal end of the shaft further comprises a frustoconical-shaped button receptacle, coaxial and adjacent to, a frustoconical-shaped button support.

16. The rotatable hook assembly according to claim 15, wherein the button receptacle and the button support are configured to snap-fit within the central void of the lock button.

17. The rotatable hook assembly according to claim 14, wherein the locking portion includes a channel for receiving the end piece.

18. A method of using a rotatable hook assembly to carry objects having handles, comprising:
  providing a rotatable hook assembly, the rotatable hook assembly comprising:
    a twist handle, comprising:
      a linear base member including a lock flange partially surrounding an entrapment bay at a first end and a rotatable member within a rotation bay disposed at a second end;
      an arcuate grasp handle connected to the first and second ends of the linear base member;
      an opening for receiving fingers disposed between the base member and the grasp handle; and
    a bag hook, comprising:
      a locking portion;
      a vertically oriented first cart member;
      a vertically oriented second cart member disposed parallel to the first cart member;
      a rotatable member receiver connected between the first and the second cart members;
      an arcuate bag storage loop extending from the locking portion and into the second cart member; and
      wherein the rotatable member receiver of the bag hook is rotatably coupled to the rotatable member with the rotation bay of the twist handle; and
  placing the rotatable hook assembly on a cart wall, wherein the first cart member and the second cart member surround both sides of the cart wall.

19. The method according to claim 18, further comprising:
  unlocking the bag hook from the twist handle;
  placing the handles of the objects onto the bag hook; and
  locking the bag hook into the twist handle.

20. The method according to claim 19, further comprising:
  unlocking the bag hook from the twist handle;
  removing the handles of the objects from the bag hook; and
  removing the rotatable hook assembly from the cart wall.

* * * * *